(12) United States Patent
Uenaka

(10) Patent No.: US 8,111,293 B2
(45) Date of Patent: Feb. 7, 2012

(54) PHOTOGRAPHIC APPARATUS

(75) Inventor: Yukio Uenaka, Tokyo (JP)

(73) Assignee: Pentax Ricoh Imaging Company, Ltd., Tokyo (JP)

(*) Notice: Subject to any disclaimer, the term of this patent is extended or adjusted under 35 U.S.C. 154(b) by 268 days.

(21) Appl. No.: 12/629,085

(22) Filed: Dec. 2, 2009

(65) Prior Publication Data

US 2010/0165126 A1   Jul. 1, 2010

(30) Foreign Application Priority Data

Dec. 25, 2008   (JP) ................................. 2008-330681

(51) Int. Cl.
*H04N 5/228* (2006.01)
*G03B 39/00* (2006.01)
*G03B 17/00* (2006.01)

(52) U.S. Cl. ............ 348/208.4; 348/208.7; 348/208.99; 396/7; 396/13; 396/50; 396/55

(58) Field of Classification Search ............... 348/208.4, 348/208.7, 208.99; 396/7, 13, 50, 55
See application file for complete search history.

(56) References Cited

U.S. PATENT DOCUMENTS

| | | | | |
|---|---|---|---|---|
| 5,727,234 A * | 3/1998 | Sakagami et al. | ............... | 396/52 |
| 6,057,889 A * | 5/2000 | Reitmeier et al. | ............ | 348/555 |
| 6,505,221 B1 * | 1/2003 | Maschmann | ................. | 708/306 |
| 6,556,783 B1 * | 4/2003 | Gelphman | ...................... | 396/20 |
| 6,714,692 B1 * | 3/2004 | Kim et al. | ...................... | 382/299 |
| 7,480,416 B2 * | 1/2009 | Liao et al. | ...................... | 382/240 |
| 7,639,933 B2 * | 12/2009 | Seo et al. | ......................... | 396/55 |
| 2002/0181593 A1 * | 12/2002 | Acharya et al. | .......... | 375/240.19 |
| 2005/0088546 A1 * | 4/2005 | Wang | .............................. | 348/239 |
| 2006/0284495 A1 * | 12/2006 | Seo et al. | ........................ | 310/12 |
| 2008/0145041 A1 * | 6/2008 | Enomoto | ........................ | 396/53 |
| 2009/0040329 A1 | 2/2009 | Uehara et al. | | |
| 2009/0040347 A1 | 2/2009 | Uehara et al. | | |
| 2009/0245768 A1 | 10/2009 | Uenaka | | |

(Continued)

FOREIGN PATENT DOCUMENTS

JP   2006-071743   3/2006

OTHER PUBLICATIONS

U.S. Appl. No. 12/630,095 to Uenaka, which was filed on Dec. 3, 2009.
U.S. Appl. No. 12/629,090 to Uenaka, which was filed on Dec. 2, 2009.
U.S. Appl. No. 12/629,074 to Uenaka, which was filed on Dec. 2, 2009.
U.S. Appl. No. 12/629,076 to Uenaka, which was filed on Dec. 2, 2009.

(Continued)

*Primary Examiner* — Lin Ye
*Assistant Examiner* — Chia-Wei A Chen
(74) *Attorney, Agent, or Firm* — Greenblum & Bernstein, P.L.C.

(57) ABSTRACT

A photographic apparatus comprises a movable platform and a controller.
The movable platform has an imager and is movable and rotatable on an xy plane perpendicular.
The controller calculates an inclination angle of the photographic apparatus, and performs a controlled movement of the movable platform for an inclination correction based on the inclination angle.
The controller calculates a first position of the movable platform before the inclination correction.
The controller calculates a second position of the movable platform after the inclination correction.
The controller determines whether the movable platform should be moved to a third position before moving from the first position to the second position in the inclination correction, on the basis of a positional relationship between the first position and the second position.
The third position is a position of the movable platform in an imaging operation by the imager without the inclination correction.

3 Claims, 20 Drawing Sheets

U.S. PATENT DOCUMENTS

| | | |
|---|---|---|
| 2009/0245770 A1 | 10/2009 | Uenaka |
| 2009/0245771 A1 | 10/2009 | Uenaka |
| 2009/0245773 A1 | 10/2009 | Uenaka |
| 2009/0245774 A1 | 10/2009 | Uenaka |
| 2009/0251551 A1 | 10/2009 | Uenaka |
| 2009/0278975 A1* | 11/2009 | Grosspietsch ............... 348/335 |
| 2010/0245603 A1* | 9/2010 | Hashi et al. ............... 348/208.5 |
| 2010/0309324 A1* | 12/2010 | Shirono .................. 348/208.11 |

OTHER PUBLICATIONS

U.S. Appl. No. 12/629,080 to Uenaka, which was filed on Dec. 2, 2009.

U.S. Appl. No. 12/629,082 to Uenaka, which was filed on Dec. 2, 2009.

* cited by examiner

Direction of gravitational force

PHOTOGRAPHIC APPARATUS

BACKGROUND OF THE INVENTION

1. Field of the Invention

The present invention relates to a photographic apparatus, and in particular, to a photographic apparatus that performs an inclination correction.

2. Description of the Related Art

There is known a type of image stabilization (also known as anti-shake, but hereinafter, simply "stabilization") apparatus for a photographic apparatus. The image stabilization apparatus corrects for the effects of hand shake either by moving a movable platform including an image stabilization lens or by moving an imager (an imaging sensor) on an xy plane perpendicular to an optical axis of a taking lens of the photographic apparatus.

Japanese unexamined patent publication (KOKAI) No. 2006-71743 discloses an image stabilization apparatus that calculates hand-shake quantity on the basis of the yaw, pitch, and roll components of hand shake, and then performs a stabilization operation on the basis of the hand-shake quantity.

In this stabilization operation, the following stabilization functions are performed: a first stabilization that corrects the yaw component of hand shake, a second stabilization that corrects the pitch component of hand shake, and a third stabilization that corrects the roll component of hand shake.

In the third stabilization, the rotation angle of the photographic apparatus is calculated from the point when the third stabilization commences. However, the inclination angle of the photographic apparatus, formed by rotation of the photographic apparatus around its optical axis, as measured with respect to a level plane, is not considered. The inclination angle changes according to the orientation of the photographic apparatus.

If the photographic apparatus is inclined when the stabilization commences, the third stabilization is performed so as to maintain this inclined state. Therefore, the inclination correction in order to level is not performed and none of the four sides of the rectangle composing the outline of the imaging surface of the imager are parallel to either the x direction or the y direction, in other words, the image is captured with the imager being inclined.

SUMMARY OF THE INVENTION

Therefore, an object of the present invention is to provide a photographic apparatus that performs the inclination correction.

According to the present invention, a photographic apparatus comprises a movable platform and a controller.

The movable platform has an imager that captures an optical image through a taking lens, and is movable and rotatable on an xy plane perpendicular to an optical axis of the taking lens.

The controller calculates an inclination angle of the photographic apparatus, which is formed by rotation of the photographic apparatus around the optical axis, as measured with respect to a level plane perpendicular to the direction of gravitational force, and performs a controlled movement of the movable platform for an inclination correction based on the inclination angle.

The controller calculates a first position of the movable platform before the inclination correction.

The controller calculates a second position of the movable platform after the inclination correction.

The controller determines whether the movable platform should be moved to a third position before moving from the first position to the second position in the inclination correction, on the basis of a positional relationship between the first position and the second position.

The third position is a position of the movable platform in an imaging operation by the imager without the inclination correction.

The second position is a position of the movable platform in an imaging operation by the imager with the inclination correction, and is a position whereto the movable platform is rotated without translation from the third position in accordance to the inclination angle.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
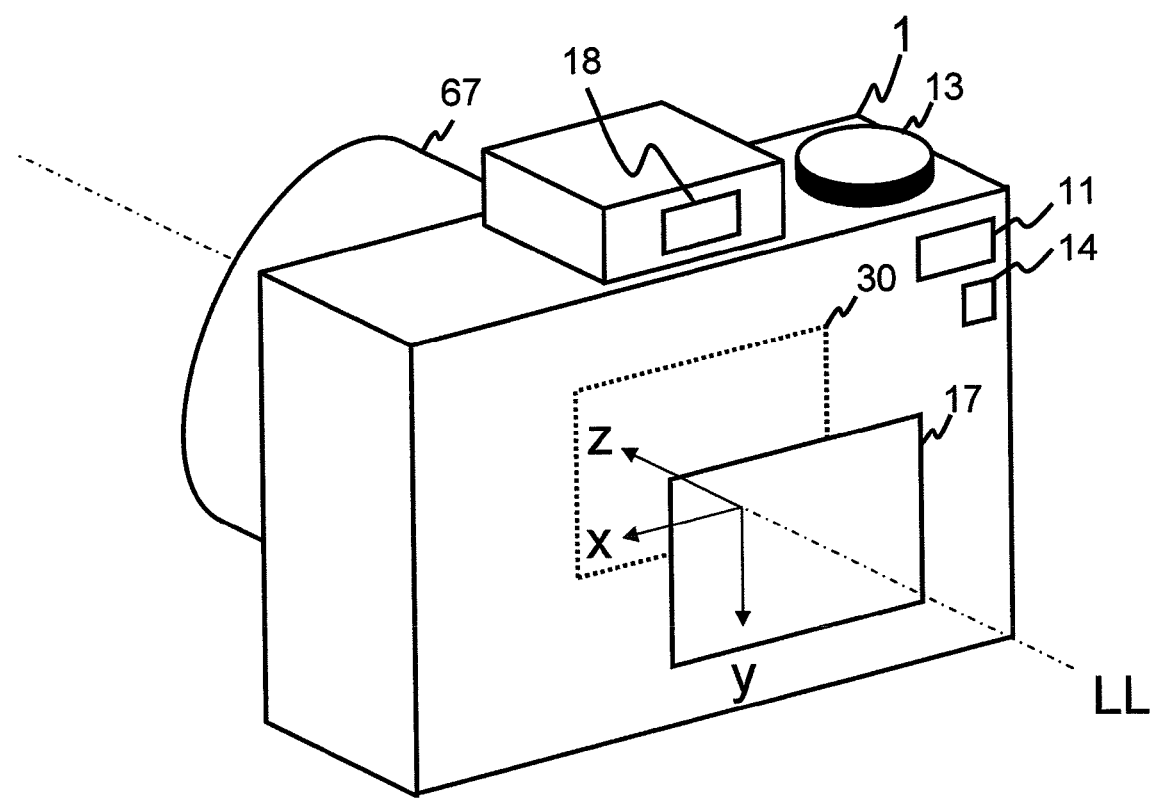
FIG. 1 is a perspective view of the embodiment of the photographic apparatus as viewed from the rear.

The present invention is described below with reference to the embodiment shown in the drawings. In the embodiment, the photographic apparatus 1 is a digital camera. A camera lens (i.e. taking lens) 67 of the photographic apparatus 1 has the optical axis LL.

By way of orientation in the embodiment, the x direction, the y direction, and the z direction are defined (see FIG. 1). The x direction is the direction perpendicular to the optical axis LL. The y direction is the direction perpendicular to the optical axis LL and the x direction. The z direction is the direction parallel to the optical axis LL and perpendicular to both the x direction and the y direction.

The relationships between the direction of gravitational force and the x direction, the y direction, and the z direction, change according to the orientation of the photographic apparatus 1.

For example, when the photographic apparatus 1 is held in the first horizontal orientation, in other words, when the photographic apparatus 1 is held horizontally and the upper surface of the photographic apparatus 1 faces upward (see FIG. 2), the x direction and the z direction are perpendicular to the direction of gravitational force and the y direction is parallel to the direction of gravitational force.

Figure 3:
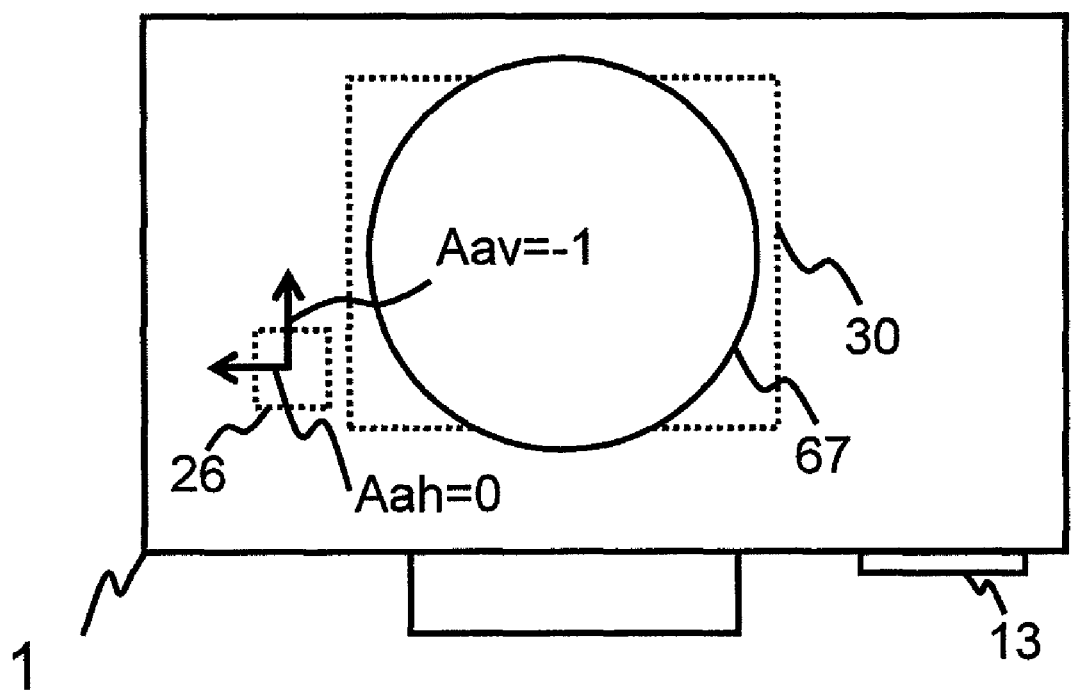
FIG. 3 is a front view of the photographic apparatus, when the photographic apparatus is held in the second horizontal orientation.

When the photographic apparatus 1 is held in the second horizontal orientation, in other words, when the photographic apparatus 1 is held horizontally and the lower surface of the photographic apparatus 1 faces upward (see FIG. 3), the x direction and the z direction are perpendicular to the direction of gravitational force and the y direction is parallel to the direction of gravitational force.

Figure 4:
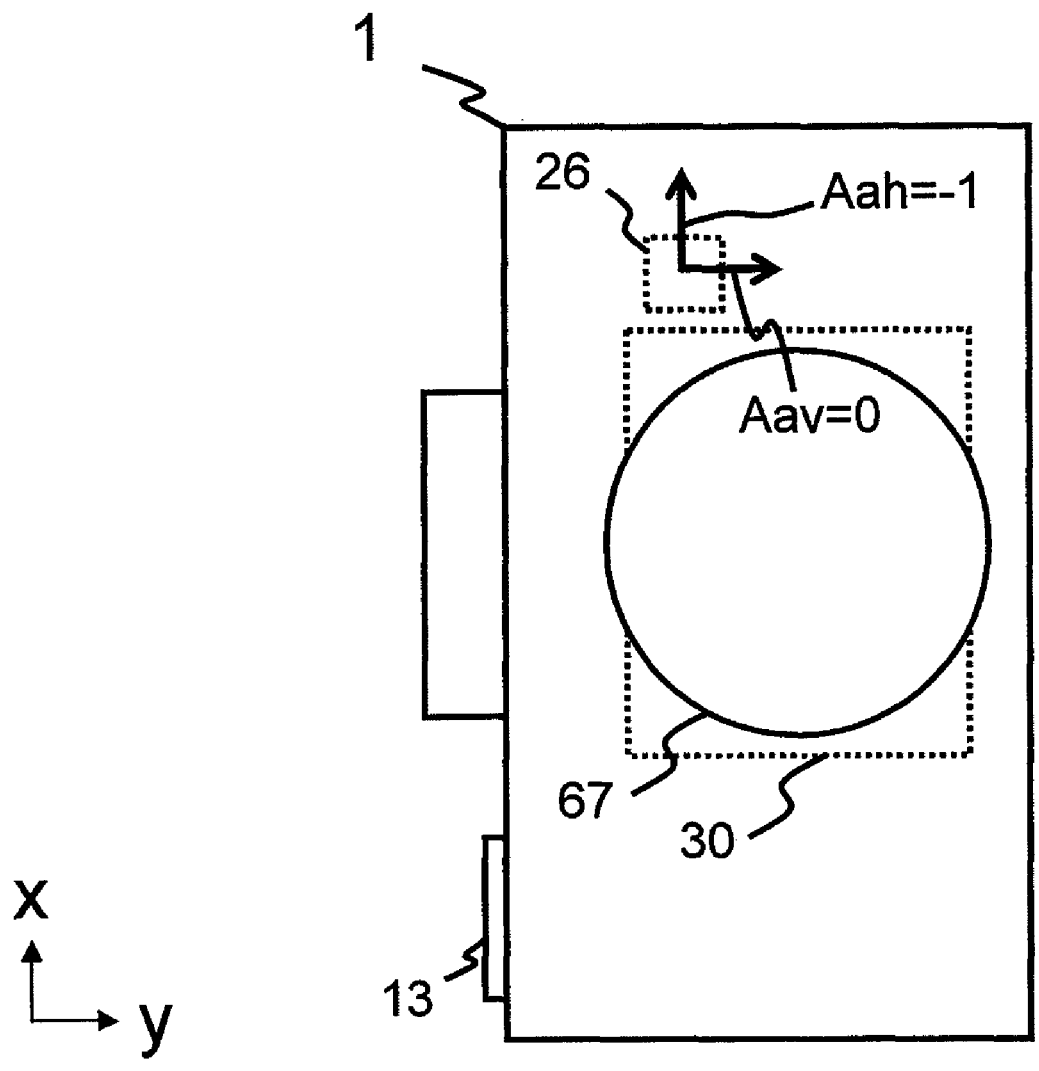
FIG. 4 is a front view of the photographic apparatus, when the photographic apparatus is held in the first vertical orientation.

When the photographic apparatus 1 is held in the first vertical orientation, in other words, when the photographic apparatus 1 is held vertically and one of the side surfaces of the photographic apparatus 1 faces upward (see FIG. 4), the x direction is parallel to the direction of gravitational force and the y direction and the z direction are perpendicular to the direction of gravitational force.

Figure 5:
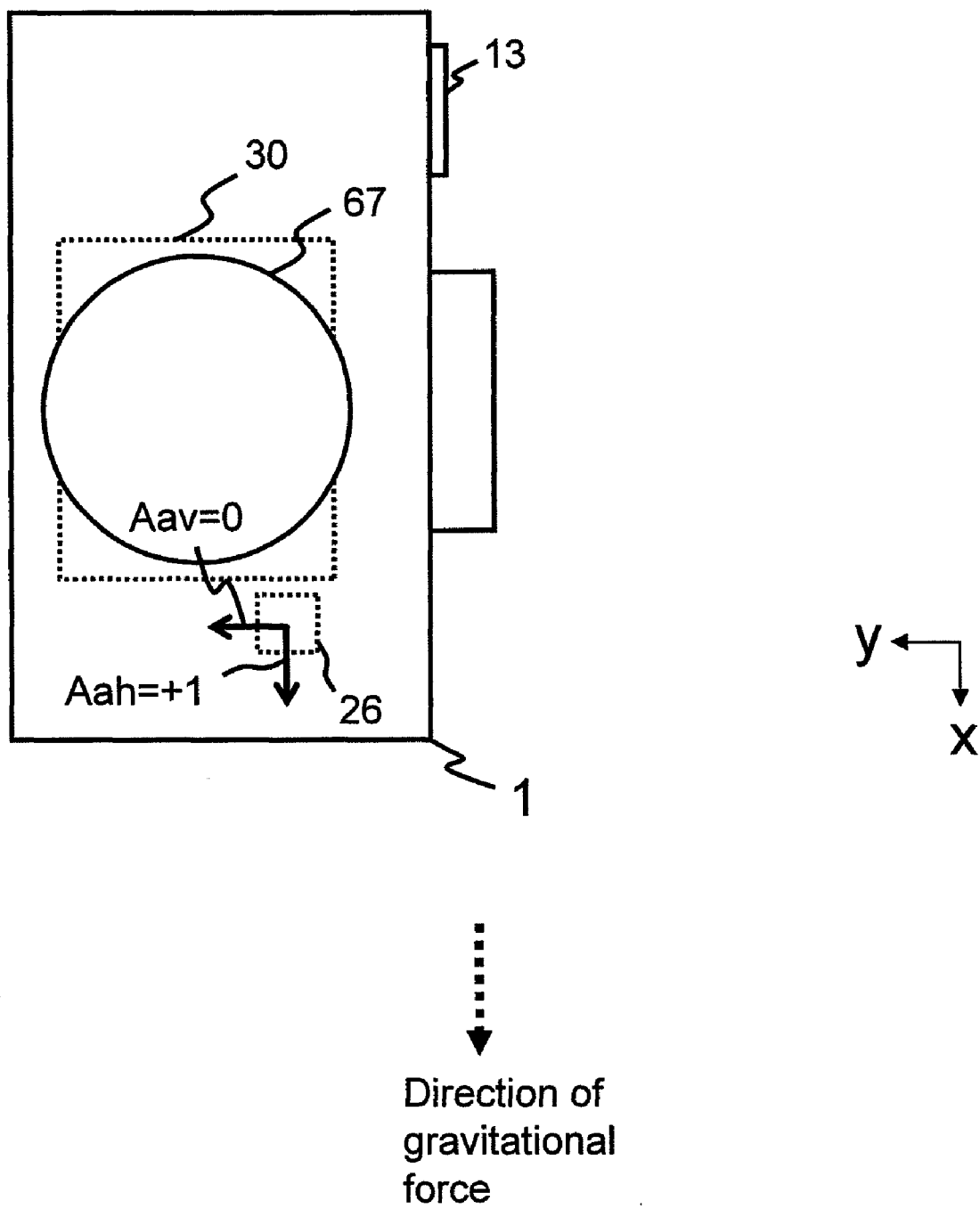
FIG. 5 is a front view of the photographic apparatus, when the photographic apparatus is held in the second vertical orientation.

When the photographic apparatus 1 is held in the second vertical orientation, in other words, when the photographic apparatus 1 is held vertically and the other side surface of the photographic apparatus 1 faces upward (see FIG. 5), the x direction is parallel to the direction of gravitational force and the y direction and the z direction are perpendicular to the direction of gravitational force.

When the front surface of the photographic apparatus 1 faces in the direction of gravitational force, the x direction and the y direction are perpendicular to the direction of gravitational force and the z direction is parallel to the direction of gravitational force. The front surface of the photographic apparatus 1 is the side on which camera lens 67 is attached.

Figure 2:
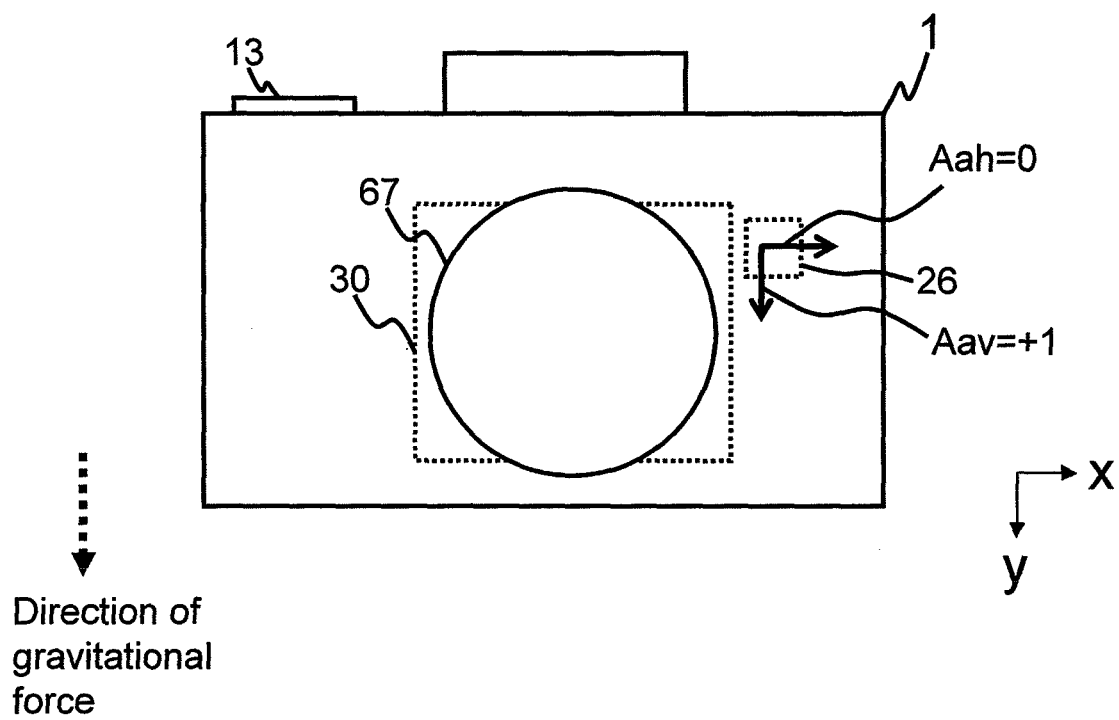
FIG. 2 is a front view of the photographic apparatus, when the photographic apparatus is held in the first horizontal orientation.
Figure 6:
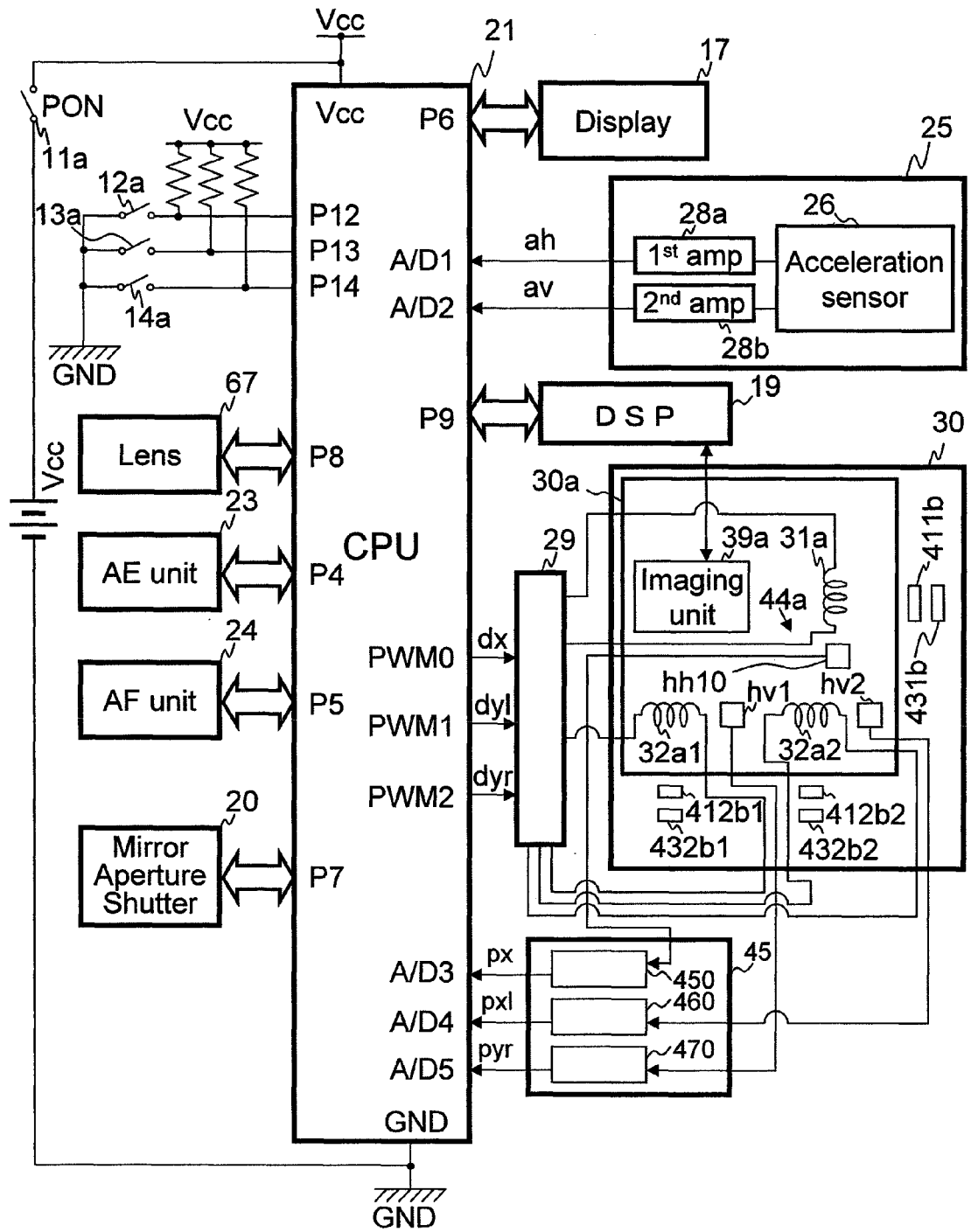
FIG. 6 is a circuit construction diagram of the photographic apparatus.

The imaging part of the photographic apparatus 1 comprises a PON button 11, a PON switch 11a, a photometric switch 12a, a shutter release button 13, a shutter release switch 13a for an exposure operation, an inclination-correction ON/OFF button 14, an inclination-correction ON/OFF switch 14a, a display 17 such as an LCD monitor or the like, an optical finder 18, a DSP 19, a mirror-aperture-shutter unit 20, a CPU 21, an AE (automatic exposure) unit 23, an AF (automatic focus) unit 24, an imaging unit 39a in the inclination correction unit 30, and the camera lens 67 (see FIGS. 1, 2, and 6).

Whether the PON switch 11a is in the ON state or OFF state is determined by the state of the PON button 11. The ON/OFF states of the photographic apparatus 1 correspond to the ON/OFF states of the PON switch 11a.

The subject image is captured as an optical image through the camera lens 67 by the imaging unit 39a, and the captured image is displayed on the display 17. The subject image can be optically observed through the optical finder 18.

When the shutter release button 13 is partially depressed by the operator, the photometric switch 12a changes to the ON state so that the photometric operation, the AF sensing operation, and the focusing operation are performed.

When the shutter release button 13 is fully depressed by the operator, the shutter release switch 13a changes to the ON state so that the imaging operation is performed by the imaging unit 39a (the imaging apparatus), and the captured image is stored.

The information indicating whether the photometric switch 12a is in the ON state or OFF state is input to port P12 of the CPU 21 as a 1-bit digital signal. The information indicating whether the shutter release switch 13a is in the ON or OFF state is input to port P13 of the CPU 21 as a 1-bit digital signal.

The display 17 is connected to port P6 of the CPU 21 for inputting and outputting signals, and displays the still image captured by the imaging operation.

The camera lens 67 is an interchangeable lens of the photographic apparatus 1 and is connected to port P8 of the CPU 21. The camera lens 67 outputs the lens information stored in a built-in ROM in the camera lens 67, to the CPU 21, when the photographic apparatus 1 is set to the ON state etc.

The DSP 19 is connected to port P9 of the CPU 21 and to the imaging unit 39a. Based on a command from the CPU 21, the DSP 19 performs the calculation operations, such as the image-processing operation, etc., on the image signal obtained by the imaging operation of the imaging unit 39a.

The mirror-aperture-shutter unit 20 is connected to port P7 of the CPU 21 and performs an UP/DOWN operation of the mirror (a mirror-up operation and a mirror-down operation), an OPEN/CLOSE operation of the aperture, and an OPEN/CLOSE operation of the shutter corresponding to the ON state of the shutter release switch 13a.

In the embodiment, the movable platform 30a is moved from the first position to the third position in a controlled movement that is performed during the mirror-up operation.

The CPU 21 is a control apparatus that controls each part of the photographic apparatus 1 in its imaging operation, and controls the movement of the movable platform 30a when the inclination correction is performed.

The inclination correction includes both the controlled movement of the movable platform 30a and position-detection efforts.

Furthermore, the CPU 21 stores the value of the inclination-correction parameter CP that indicates whether the photographic apparatus 1 is in the inclination-correction mode or not, the value of the release-state parameter RP, the value of the rotation parameter RD, and the value of the mirror-state parameter MP.

The value of the release-state parameter RP changes with respect to the release-sequence operation. When the release-sequence operation is performed, the value of the release-state parameter RP is set to 1 (see steps S21 to S26 in FIG. 15), otherwise, the value of the release-state parameter RP is set (reset) to 0 (see steps S12 in FIG. 14 and S27 in FIG. 15).

The value of the rotation parameter RD changes with respect to the position status of the movable platform 30a. When the movable platform 30a is in the intermediate third position (the movable platform 30a is in the first state), while in the process of being moved from the first position to the second position, the value of the rotation parameter RD is set to 1 (see step S64 in FIG. 16); otherwise, the value of the rotation parameter RD is set to 0 (see step S57 in FIG. 16).

The first position is the initial position of the movable platform 30a before the inclination correction. The second position is the position S of the movable platform 30a after the inclination correction.

The first state represents the position and orientation of the movable platform 30a when the imaging operation is performed without the inclination correction, under the condition where the movable platform 30a is positioned at the center of its movement range in both the x and y directions, and each of the four sides of the rectangle composing the outline of the imaging surface of the imager (an imaging sensor) 39a1 is parallel to either the x direction or the y direction.

Figure 14:
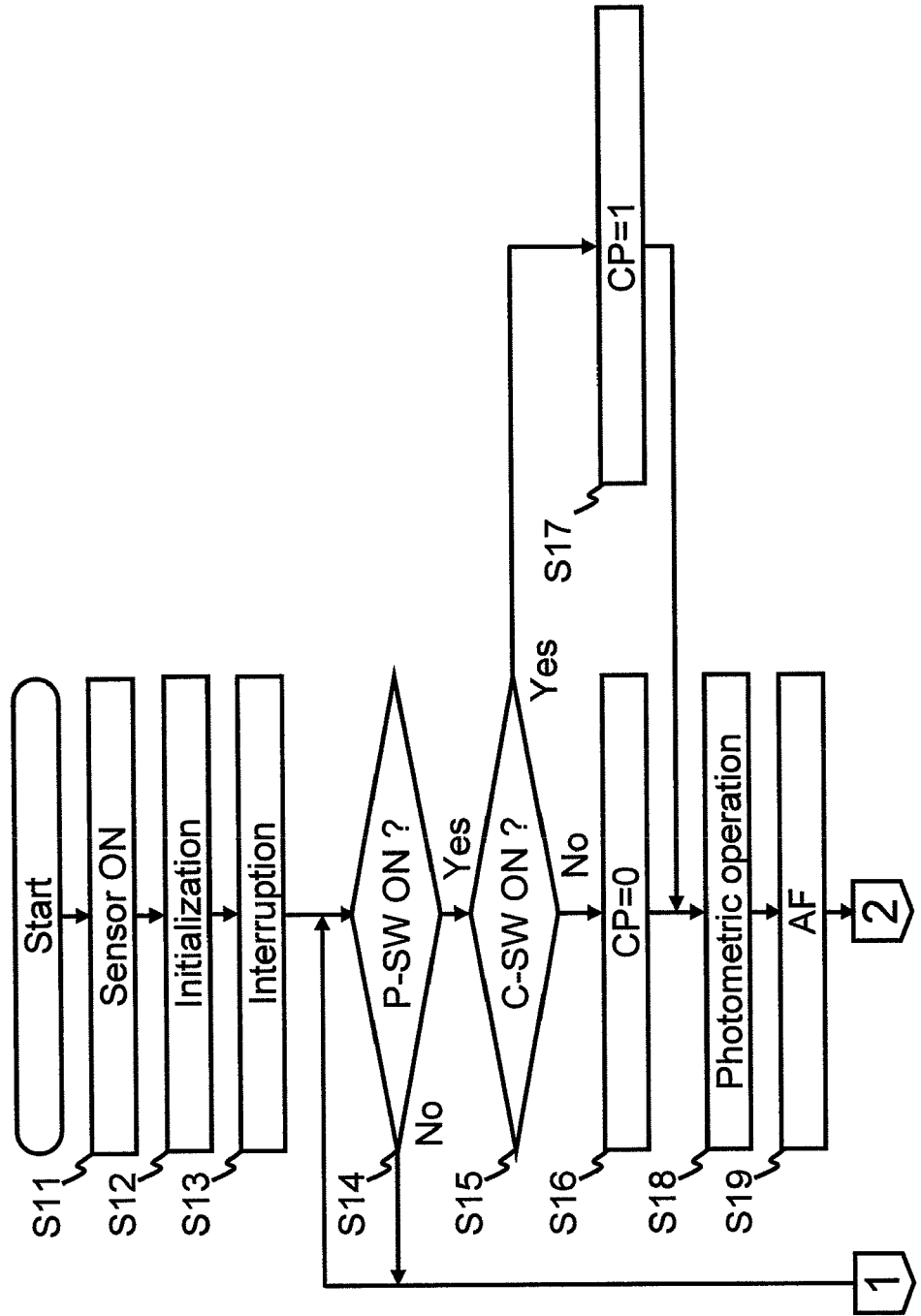
FIGS. 14 and 15 are a flowchart that shows the main operation of the photographic apparatus.
Figure 15:
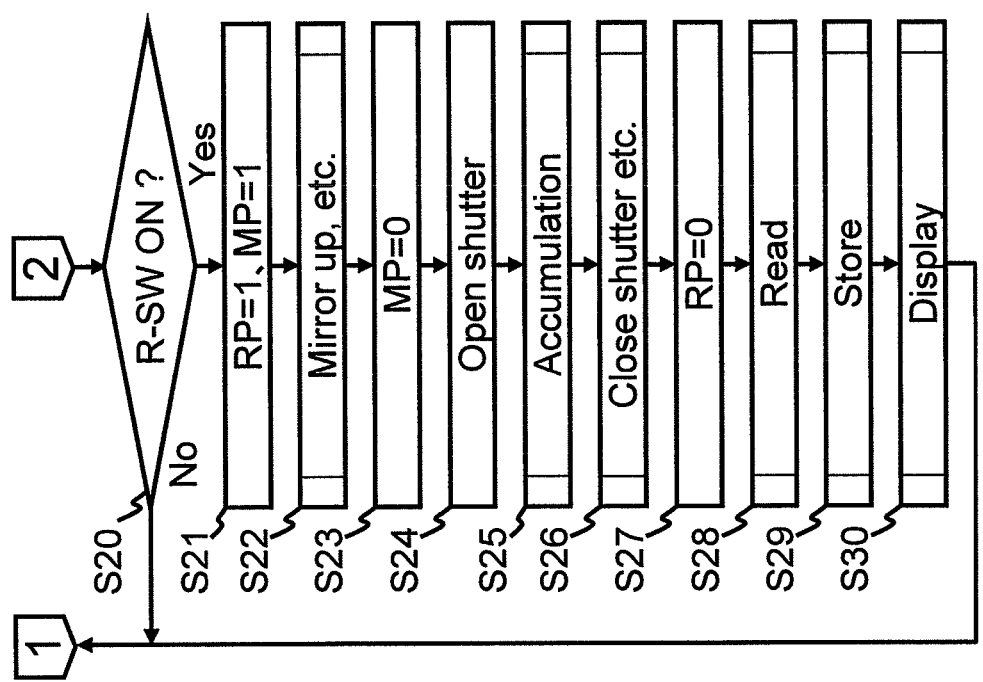

While the mirror-up operation is being performed before the exposure operation for the imaging operation, the value of the mirror-state parameter MP is set to 1 (see step S21 in FIG. 15); otherwise, the value of the mirror-state parameter MP is set to 0 (see steps S12 in FIG. 14 and S23 in FIG. 15).

Whether the mirror-up operation of the photographic apparatus 1 is finished is determined by the detection of the ON/OFF states of a mechanical switch (not depicted). Whether the mirror-down operation of the photographic apparatus 1 is finished is determined by the detection of the completion of the shutter charge.

The AE unit (exposure-calculating unit) 23 performs the photometric operation and calculates photometric values based on the subject being photographed. The AE unit 23 also calculates the aperture value and the duration of the exposure operation, with respect to the photometric values, both of which are needed for the imaging operation. The AF unit 24 performs the AF sensing operation and the corresponding focusing operation, both of which are needed for the imaging operation. In the focusing operation, the camera lens 67 is re-positioned along the optical axis LL.

The AE unit 23 is connected to port P4 of the CPU 21 for inputting and outputting signals. The AF unit 24 is connected to port P5 of the CPU 21 for inputting and outputting signals.

The inclination-correction part (the inclination-correction apparatus) of the photographic apparatus 1 comprises an inclination-correction ON/OFF button 14, an inclination-correction ON/OFF switch 14a, a display 17, a CPU 21, an inclination detection unit 25, a driver circuit 29, an inclination correction unit 30, and a hall sensor signal-processing unit (a signal processing circuit of the magnetic-field change-detecting element) 45.

The ON/OFF states of the inclination-correction ON/OFF switch 14a change according to the operation state of the inclination-correction ON/OFF button 14.

Specifically, when the inclination-correction ON/OFF button 14 is depressed by the operator, the inclination-correction ON/OFF switch 14a is changed to the ON state so that the inclination correction, in which the inclination detection unit 25 and the inclination correction unit 30 are driven independently of the other operations that include the photometric operation etc., is carried out in the predetermined time interval. When the inclination-correction ON/OFF switch 14a is in the ON state, (in other words in the inclination-correction mode), the inclination-correction parameter CP is set to 1 (CP=1). When the inclination-correction ON/OFF switch 14a is not in the ON state, (in other words in the non-inclination correction mode), the inclination-correction parameter CP is set to 0 (CP=0). In the embodiment, the value of the predetermined time interval is set to 1 ms.

The information indicating whether the inclination-correction ON/OFF switch 14a is in the ON or OFF state is input to port P14 of the CPU 21 as a 1-bit digital signal.

Next, the details of the input and output relationships between the CPU 21 and the inclination detection unit 25, the driver circuit 29, the inclination correction unit 30, and the hall sensor signal-processing unit 45 are explained.

The inclination detection unit 25 has an acceleration sensor 26, a first amplifier 28a, and a second amplifier 28b.

The acceleration sensor 26 detects a first gravitational component and a second gravitational component. The first gravitational component is the horizontal component of gravitational acceleration in the x direction. The second gravitational component is the vertical component of gravitational acceleration in the y direction.

The first amplifier 28a amplifies the signal representing the first gravitational component output from the acceleration sensor 26, and outputs the analog signal to the A/D converter A/D 1 of the CPU 21 as a first acceleration ah.

The second amplifier 28b amplifies the signal representing the second gravitational component output from the acceleration sensor 26, and outputs the analog signal to the A/D converter A/D 2 of the CPU 21 as a second acceleration av.

When the inclination correction is performed (CP=1), the inclination correction unit 30 rotates the movable platform 30a including the imaging unit 39a around an axis parallel to the optical axis LL in order to correct (reduce) the inclination of the photographic apparatus 1 caused by its undesired rotation about the optical axis LL, as measured with respect to a level plane perpendicular to the direction of gravitational force.

In other words, in the inclination correction, the controlled movement repositions the movable platform 30a so that the upper and lower sides of the rectangle composing the outline of the imaging surface of the imager 39a1 are perpendicular to the direction of gravitational force and the left and right sides are parallel to the direction of gravitational force.

Therefore, the imager 39a1 can be automatically leveled without using a level vial. When the photographic apparatus 1 images a subject including the horizon, the imaging operation can be performed with the upper and lower sides of the rectangle composing the outline of the imaging surface of the imager 39a1 parallel to the horizon.

Specifically, the inclination correction unit 30 is an apparatus that performs the inclination correction by moving the imaging unit 39a to the position S where the imaging unit 39a (the movable platform 30a) should be moved, as calculated by the CPU 21 based on the information from the inclination detection unit 25.

The inclination correction unit 30 has a fixed unit 30b and a movable platform 30a that includes the imaging unit 39a and can be displaced and rotated on the xy plane.

The supply of electric power to the CPU 21 and each part of the inclination detection unit 25 begins after the PON switch 11a is set to the ON state (i.e. when the main power supply is set to the ON state). Inclination detection efforts by the inclination detection unit 25 for calculating the inclination angle (the camera inclination angle Kθ) begin after the PON switch 11a is set to the ON state.

The CPU 21 converts the first acceleration ah, which is input to the A/D converter A/D 1, to a first digital acceleration signal Dah (A/D conversion operation). It also calculates a first digital acceleration Aah by reducing the high-frequency component of the first digital acceleration signal Dah (the digital low-pass filtering) in order to reduce the noise component in the first digital acceleration signal Dah.

Similarly, the CPU 21 converts the second acceleration av, which is input to the A/D converter A/D 2, to a second digital acceleration signal Dav (A/D conversion operation). It also calculates a second digital acceleration Aav by reducing the high-frequency component of the second digital acceleration signal Dav (the digital low-pass filtering) in order to reduce the noise component in the second digital acceleration signal Dav.

Figure 7:
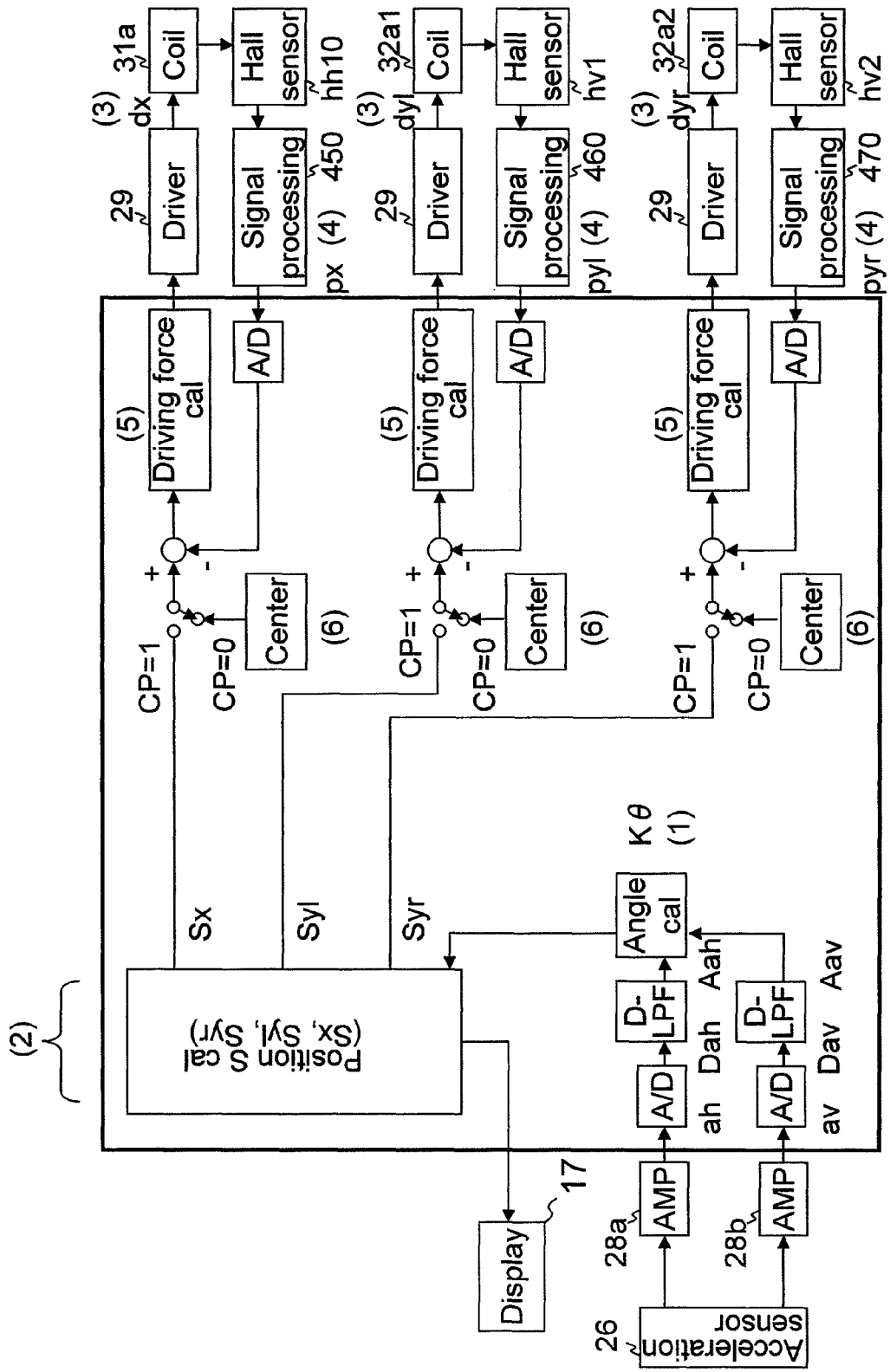
FIG. 7 illustrates the calculations involved in the inclination correction.

The CPU 21 also calculates the camera inclination angle $K\theta$ of the photographic apparatus 1, which is formed by rotation of the photographic apparatus 1 around its optical axis LL, as measured with respect to the level plane perpendicular to the direction of gravitational force, on the basis of the magnitude of the difference between the absolute value of the first digital acceleration Aah and the absolute value of the second digital acceleration Aav (see (1) in FIG. 7).

The camera inclination angle $K\theta$ of the photographic apparatus 1 changes according to the orientation of the photographic apparatus 1 and is measured with respect to one of either the first horizontal orientation, the second horizontal orientation, the first vertical orientation, or the second vertical orientation. Therefore, the camera inclination angle $K\theta$ of the photographic apparatus 1 is represented by the angle at which the x direction or the y direction intersects the level plane.

When one of either the x direction or y direction lies on the level plane, and when the other of the x direction or y direction intersects the level plane at an angle of 90 degrees, the photographic apparatus 1 is in a non-inclined state.

Thus, the CPU 21 and the inclination detection unit 25 have a function for calculating the inclination angle of the photographic apparatus 1.

The first digital acceleration Aah (the first gravitational component) and the second digital acceleration Aav (the second gravitational component) change according to the orientation of the photographic apparatus 1, and take values from −1 to +1.

For example, when the photographic apparatus 1 is held in the first horizontal orientation, in other words, when the photographic apparatus 1 is held horizontally and the upper surface of the photographic apparatus 1 faces upward (see FIG. 2), the first digital acceleration Aah is 0 and the second digital acceleration Aav is +1.

When the photographic apparatus 1 is held in the second horizontal orientation, in other words, when the photographic apparatus 1 is held horizontally and the lower surface of the photographic apparatus 1 faces upward (see FIG. 3), the first digital acceleration Aah is 0 and the second digital acceleration Aav is −1.

When the photographic apparatus 1 is held in the first vertical orientation, in other words, when the photographic apparatus 1 is held vertically and one of the side surfaces of the photographic apparatus 1 faces upward (see FIG. 4), the first digital acceleration Aah is −1 and the second digital acceleration Aav is 0.

When the photographic apparatus 1 is held in the second vertical orientation, in other words, when the photographic apparatus 1 is held vertically and the other side surface of the photographic apparatus 1 faces upward (see FIG. 5), the first digital acceleration Aah is +1 and the second digital acceleration Aav is 0.

When the front surface of the photographic apparatus 1 faces the direction of gravitational force or the opposite direction, in other words, when the front surface of the photographic apparatus 1 faces upward or downward, the first digital acceleration Aah and the second digital acceleration Aav are 0.

Figure 8:
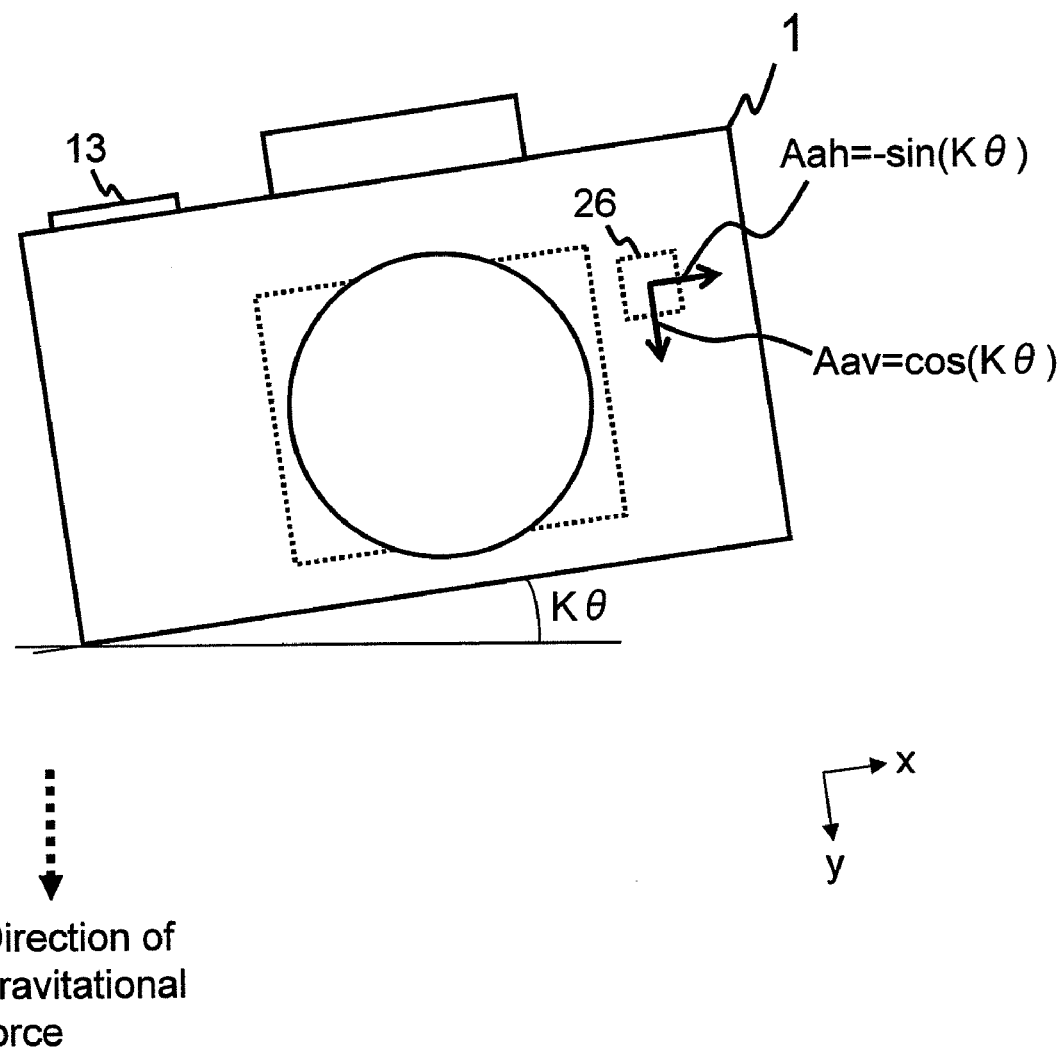
FIG. 8 is a front view of the photographic apparatus, and $K\theta$ is the angle formed when the photographic apparatus is rotated (inclined) in a counter-clockwise direction as viewed from the front, away from the first horizontal orientation.

When the photographic apparatus 1 is rotated (inclined) at an angle $K\theta$ in a counter-clockwise direction, as viewed from the front, from the first horizontal orientation (see FIG. 8), the first digital acceleration Aah is $-\sin(K\theta)$ and the second digital acceleration Aav is $+\cos(K\theta)$.

Therefore, the inclination angle (the camera inclination angle $K\theta$) can be calculated by performing an arcsine transformation on the first digital acceleration Aah and taking the negative or by performing an arccosine transformation on the second digital acceleration Aav.

Figure 18:
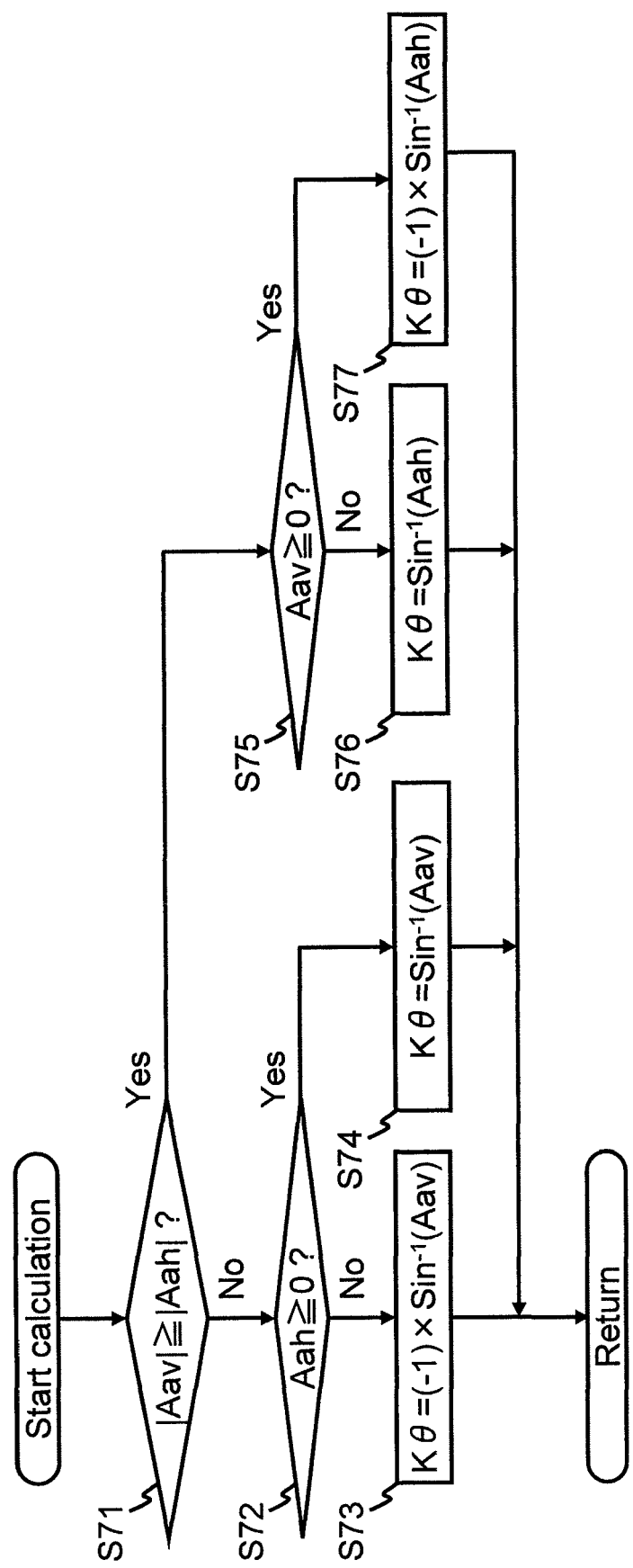
FIG. 18 is a flowchart that shows the details of the calculation of the camera inclination angle.

However, while the absolute value of the inclination angle $K\theta$ is very small, in other words, nearly 0, the variation of the sine function is larger than that of the cosine function so that the inclination angle is best calculated by using the arcsine transformation rather than the arccosine transformation ($K\theta = -\sin^{-1}(Aah)$, see step S77 in FIG. 18).

Figure 9:
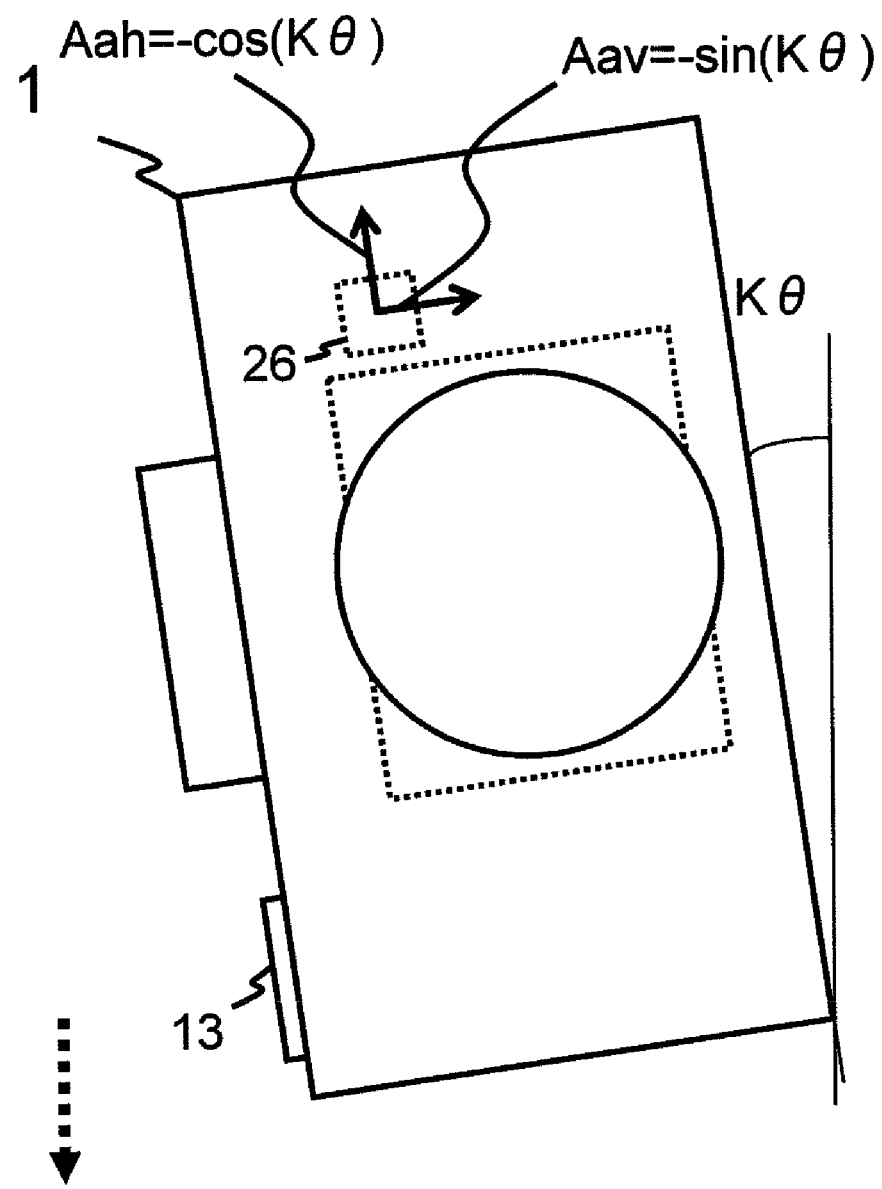
FIG. 9 is a front view of the photographic apparatus, and $K\theta$ is the angle formed when the photographic apparatus is rotated (inclined) in a counter-clockwise direction as viewed from the front, away from the first vertical orientation.

When the photographic apparatus 1 is rotated (inclined) at an angle $K\theta$ in a counter-clockwise direction, as viewed from the front, from the first vertical orientation (see FIG. 9), the first digital acceleration Aah is $-\cos(K\theta)$ and the second digital acceleration Aav is $-\sin(K\theta)$.

Therefore, the inclination angle (the camera inclination angle $K\theta$) can be calculated by performing an arccosine transformation on the first digital acceleration Aah and taking the negative or by performing an arcsine transformation on the second digital acceleration Aav and taking the negative.

However, while the absolute value of the inclination angle $K\theta$ is very small, in other words, nearly 0, the variation of the sine function is larger than that of the cosine function so that the inclination angle is best calculated by using the arcsine transformation rather than the arccosine transformation ($K\theta = -\sin^{-1}(Aav)$, see step S73 in FIG. 18).

Figure 10:
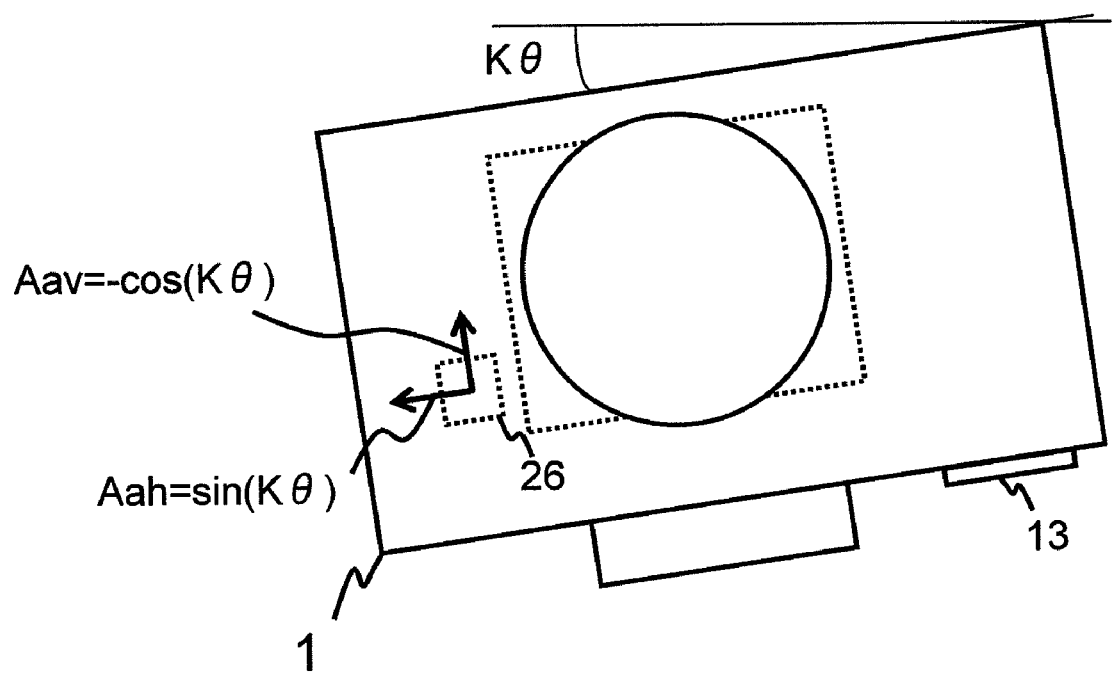
FIG. 10 is a front view of the photographic apparatus, and $K\theta$ is the angle formed when the photographic apparatus is rotated (inclined) in a counter-clockwise direction as viewed from the front, away from the second horizontal orientation.

When the photographic apparatus 1 is rotated (inclined) at an angle $K\theta$ in a counter-clockwise direction, as viewed from the front, from the second horizontal orientation (see FIG. 10), the first digital acceleration Aah is $+\sin(K\theta)$ and the second digital acceleration Aav is $-\cos(K\theta)$.

Therefore, the inclination angle (the camera inclination angle $K\theta$) can be calculated by performing an arcsine transformation on the first digital acceleration Aah or by performing an arccosine transformation on the second digital acceleration Aav and taking the negative.

However, while the absolute value of the inclination angle $K\theta$ is very small, in other words, nearly 0, the variation of the sine function is larger than that of the cosine function so that the inclination angle is best calculated by using the arcsine transformation rather than the arccosine transformation ($K\theta = +\sin^{-1}(Aah)$, see step S76 in FIG. 18).

Figure 11:
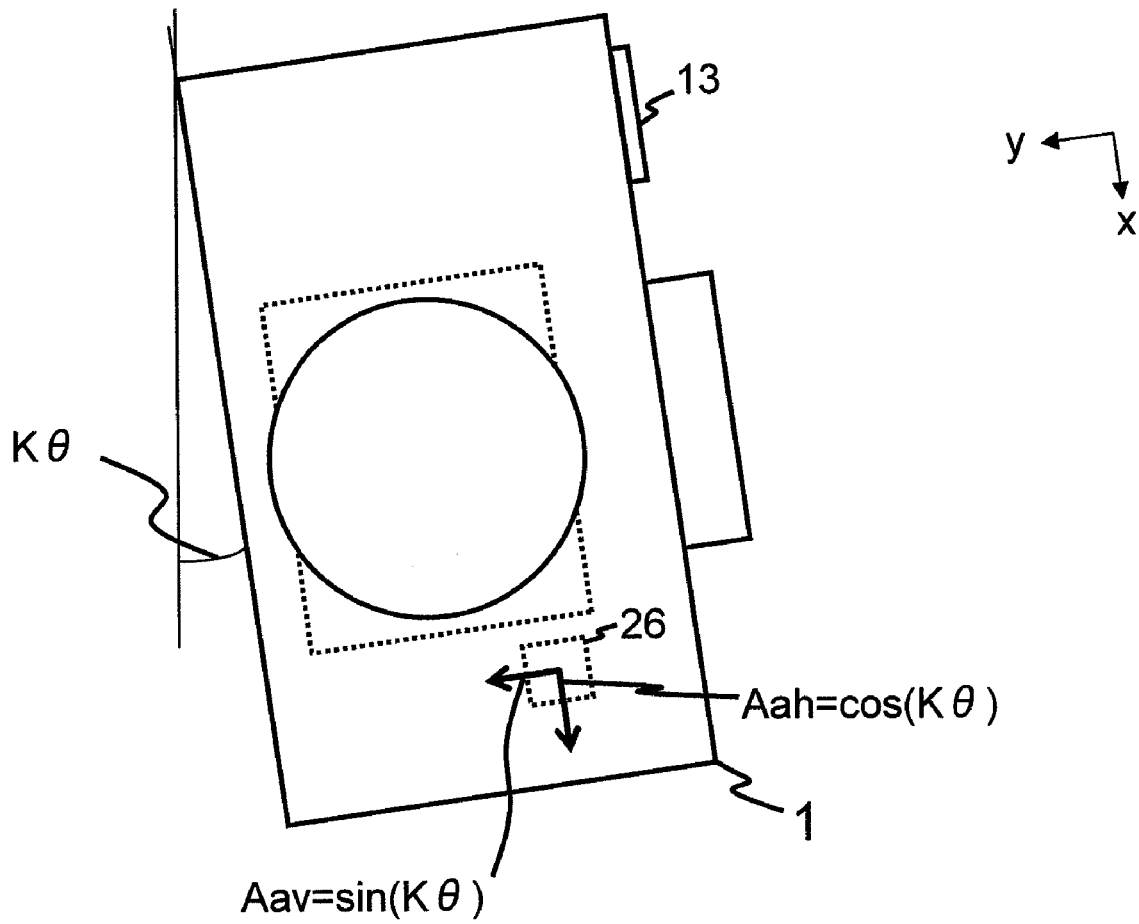
FIG. 11 is a front view of the photographic apparatus, and $K\theta$ is the angle formed when the photographic apparatus is rotated (inclined) in a counter-clockwise direction as viewed from the front, away from the second vertical orientation.

When the photographic apparatus 1 is rotated (inclined) at an angle $K\theta$ in a counter-clockwise direction, as viewed from the front, from the second vertical orientation (see FIG. 11), the first digital acceleration Aah is $+\cos(K\theta)$ and the second digital acceleration Aav is $+\sin(K\theta)$.

Therefore, the inclination angle (the camera inclination angle $K\theta$) can be calculated by performing an arccosine transformation on the first digital acceleration Aah or by performing an arcsine transformation on the second digital acceleration Aav.

However, while the absolute value of the inclination angle $K\theta$ is very small, in other words, is nearly 0, the variation of the sine function is larger than that of the cosine function so that the inclination angle is best calculated by using the arcsine transformation rather than the arccosine transformation ($K\theta=+\sin^{-1}$ (Aav), see step S74 in FIG. 18).

The inclination angle, in other words, the camera inclination angle $K\theta$ is calculated by performing the arcsine transformation on the smaller of the absolute value of the first digital acceleration Aah and the absolute value of the second digital acceleration Aav and by adding a positive or negative sign ($K\theta=+\sin^{-1}$ (Aah), $-\sin^{-1}$ (Aah), $+\sin^{-1}$ (Aav), or $-\sin^{-1}$ (Aav)).

Whether the positive or negative sign is added is determined on the basis of the larger of the absolute value of the first digital acceleration Aah and the absolute value of the second digital acceleration Aav, and the sign of that larger value without applying the absolute value (see steps S72 and S75 in FIG. 18). The details of this decision are explained by using the flowchart in FIG. 18.

In the embodiment, the acceleration detection operation that occurs during the interrupt process includes a process in the inclination detection unit 25 and the input of the first acceleration ah and the second acceleration av from the inclination detection unit 25 to the CPU 21.

The camera inclination angle $K\theta$ determines the magnitude of the rotation quantity $\alpha$ of the movable platform 30a in the inclination correction ($\alpha=-K\theta$).

Figure 17:
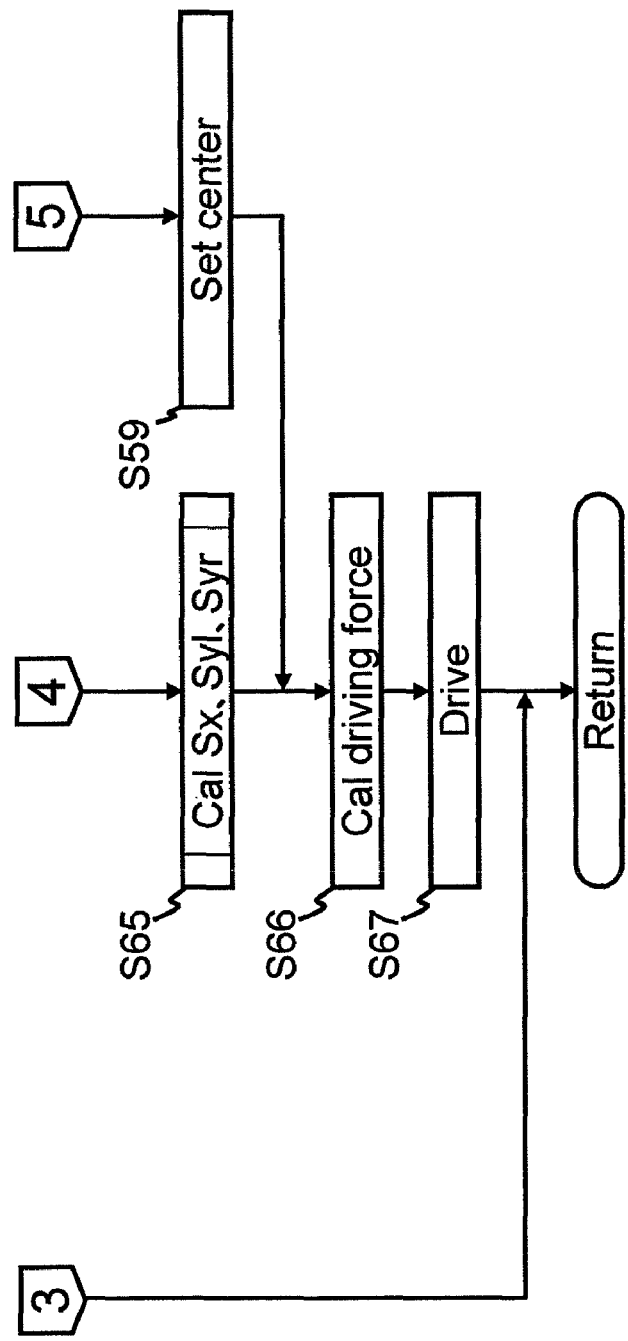

The CPU 21 calculates the position S (Sx, Syl, Syr) where the imaging unit 39a (the movable platform 30a) should be moved in accordance to the rotation quantity $\alpha$ (see (2) in FIG. 7 and step S65 in FIG. 17), and moves the movable platform 30a from the present position P (the first position) to the calculated position S (the second position).

The CPU 21 determines whether the movable platform 30a should be moved to the third position (where the movable platform 30a is in the first state) before being moved to the second position, on the basis of the positional relationship between the present position P (the first position) of the movable platform 30a and the position S (the second position) of the movable platform 30a.

The first position is the position of the movable platform 30a before the inclination correction.

The second position is the position of the movable platform 30a in the imaging operation with the inclination correction.

The third position is the position of the movable platform 30a in the imaging operation without the inclination correction, under the condition where the movable platform 30a is positioned at the center of its movement range in both the x and y directions, and each of the four sides of the rectangle composing the outline of the imaging surface of the imager (an imaging sensor) 39a1 is parallel to either the x direction or the y direction.

Specifically, when the rotation angle for moving the movable platform 30a from the present position P (the first position) to the position S (the second position) is larger than a threshold angle LV, the CPU 21 determines that the movable platform 30a should first be moved to the intermediate third position before being moved to the second position.

This rotation angle is shown as the absolute value of the difference between the rotation quantity $\alpha$ and the movable platform inclination angle $\beta$ ($=|\alpha-\beta|$).

After the movable platform 30a is moved to the third position, the CPU 21 moves the movable platform 30a to the position S (the second position). Specifically, the CPU 21 rotates the movable platform 30a around the center O of the imaging surface of the imager 39a1, in accordance to the rotation quantity $\alpha$.

When the rotation angle $|\alpha-\beta|$ is not larger than the threshold angle LV, the CPU 21 determines that the movable platform 30a should be moved directly to the second position without going through the intermediate third position. So, the CPU 21 directly moves the movable platform 30a from the first position to the second position.

After the movable platform 30a is moved to the position S, the CPU 21 rotates the movable platform 30a around the center O of the imaging surface of the imager 39a1, in accordance to the rotation quantity $\alpha$ corresponding to the camera inclination angle $K\theta$, in the predetermined time interval (1 ms).

Note that the movable platform inclination angle $\beta$ is calculated on the basis of the hall sensor distance coefficient HSD, the first vertical detected position signal pyl and the second vertical detected position signal pyr ($\beta=\sin^{-1}$ ((pyl−pyr)÷HSD)). The hall sensor distance coefficient HSD, which is the fixed value that is determined by design in advance, is the relative distance between the first vertical hall sensor hv1 and the second vertical hall sensor hv2.

When the inclination correction is not performed (CP=0), the CPU 21 sets the position S (Sx, Syl, Syr), where the movable platform 30a should be moved, to the third position (see (6) in FIG. 7 and step S59 in FIG. 17), and then the CPU 21 moves the movable platform 30a to the third position.

A driving point on the movable platform 30a for moving the movable platform 30a in the x direction is defined as a horizontal driving point DPx.

Figure 12:
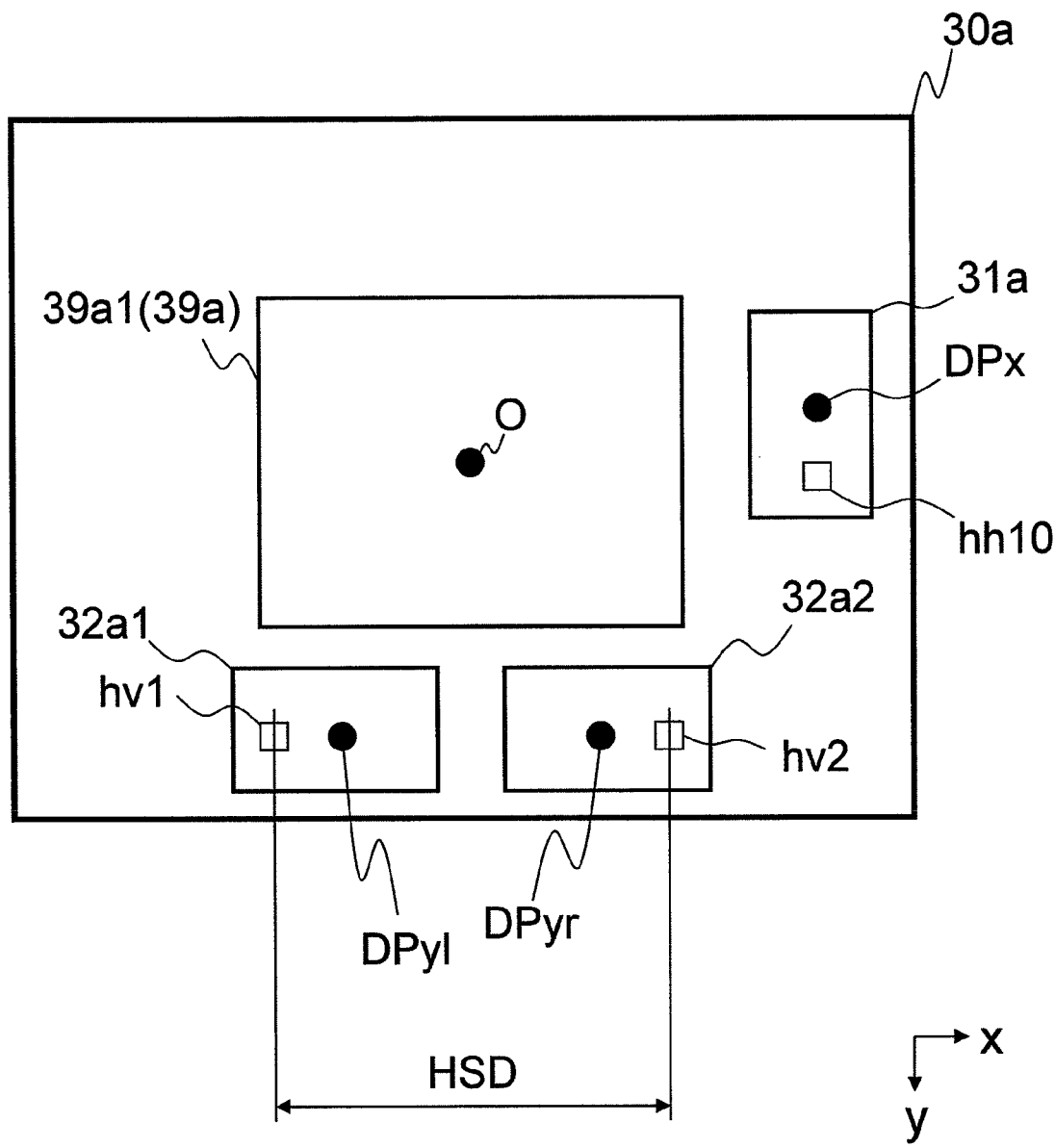
FIG. 12 is a construction diagram of the movable platform.
Figure 13:
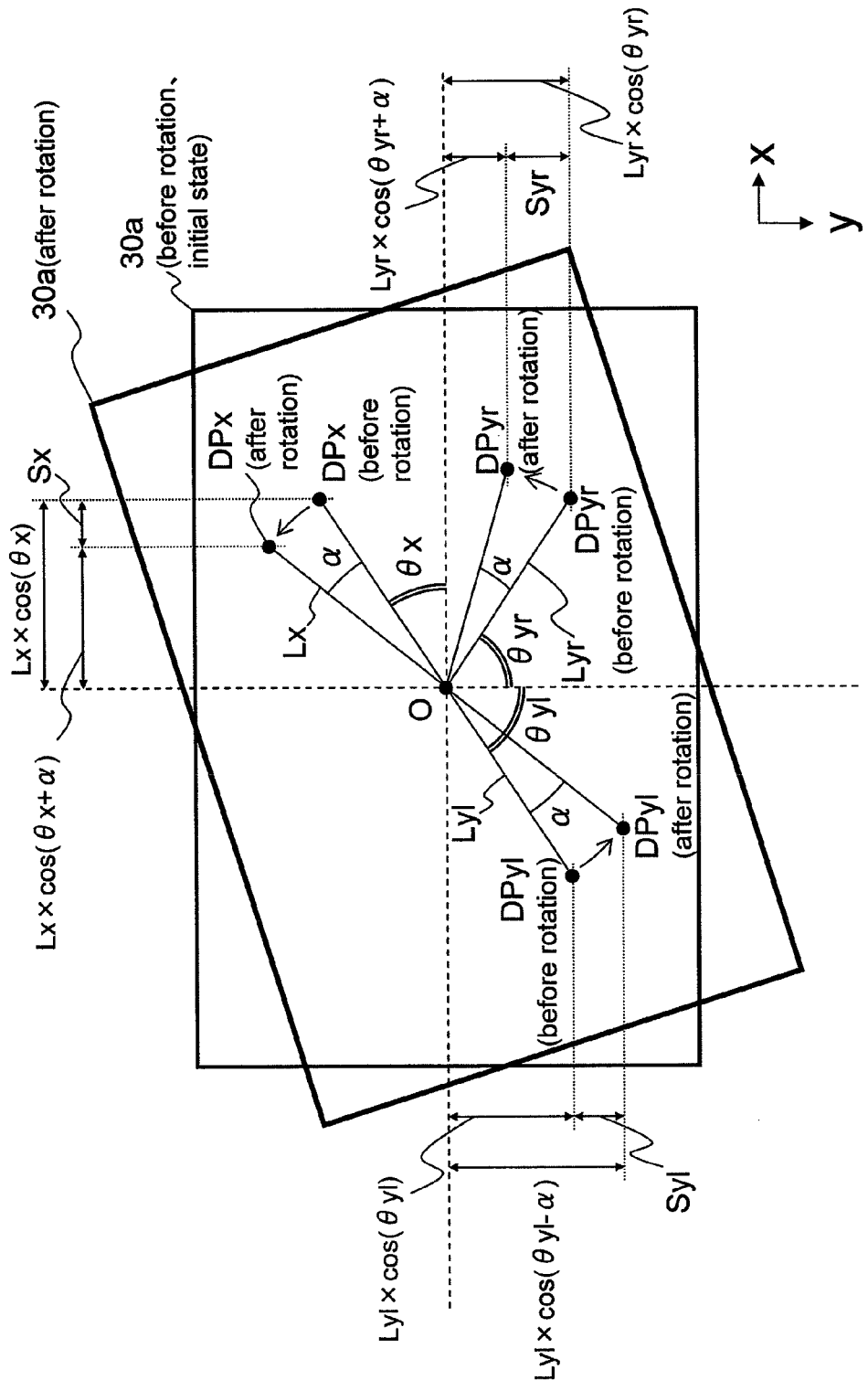
FIG. 13 illustrates the movement quantity of the horizontal driving point DPx in the x direction, the movement quantities of the first and second vertical driving points DPyl and DPyr in the y direction, in accordance to the rotation quantity $\alpha$.

Driving points on the movable platform 30a for moving the movable platform 30a in the y direction and for rotating the movable platform 30a are defined as a first vertical driving point DPyl and a second vertical driving point DPyr (see FIGS. 12 and 13).

The horizontal driving point DPx is the point to which a horizontal electro-magnetic force based on a coil for driving the movable platform 30a in the x direction (the horizontal coil 31a) is applied. The horizontal driving point DPx is set to a position close to the horizontal hall sensor hh10.

The first vertical driving point DPyl is the point to which a first electro-magnetic force based on a coil for driving the movable platform 30a in the y direction (the first vertical coil 32a1) is applied. The first vertical driving point DPyl is set to a position close to the first vertical hall sensor hv1.

The second vertical driving point DPyr is the point to which a second electro-magnetic force based on a coil for driving the movable platform 30a in the y direction (the second vertical coil 32a2) is applied. The second vertical driving point DPyr is set to a position close to the second vertical hall sensor hv2.

The movement position Sx of the horizontal driving point DPx, which is the movement quantity to the position of the horizontal driving point DPx in the first state, is calculated on the basis of the rotation quantity $\alpha$ (Sx=Lx×cos($\theta$x+$\alpha$)−Lx×cos($\theta$x)).

Note that the distance Lx is the distance between the rotation center O of the imaging surface of the imager 39a1 and the horizontal driving point DPx.

The angle $\theta$x is the angle between the x direction and the line passing through the rotation center O and the horizontal driving point DPx in the first state.

The values Lx and $\theta$x are fixed values that are determined by design in advance (see FIG. 13).

The movement position Syl of the first vertical driving point DPyl, which is the movement quantity to the position of the first vertical driving point DPyl in the first state, is calculated on the basis of the rotation quantity $\alpha$ (Syl=Lyl×cos($\theta$yl−$\alpha$)−Lyl×cos($\theta$yl)).

Note that the distance Lyl is the distance between the rotation center O of the imaging surface of the imager 39a1 and the first vertical driving point DPyl.

The angle θyl is the angle between the y direction and the line passing through the rotation center O and the first vertical driving point DPyl in the first state.

The values Lyl and θyl are fixed values that are determined by design in advance.

The movement position Syr of the second vertical driving point DPyr, which is the movement quantity to the position of the second vertical driving point DPyr in the first state, is calculated on the basis of the rotation quantity α (Syr=Lyr×cos(θyr+α)−Lyl×cos(θyr)).

Note that the distance Lyr is the distance between the rotation center O of the imaging surface of the imager 39*a*1 and the second vertical driving point DPyr.

The angle θyr is the angle between the y direction and the line passing through the rotation center O and the second vertical driving point DPyr in the first state.

The values Lyr and θyr are fixed values that are determined by design in advance.

The movement/rotation of the movable platform 30*a*, which includes the imaging unit 39*a*, is performed by using an electro-magnetic force and is described later.

The driving force D is for driving the driver circuit 29 in order to move the movable platform 30*a* to the position S.

The horizontal direction component of the driving force D for the horizontal coil 31*a* is defined as the horizontal driving force Dx (after D/A conversion, the horizontal PWM duty dx).

The vertical direction component of the driving force D for the first vertical coil 32*a*1 is defined as the first vertical driving force Dyl (after D/A conversion, the first vertical PWM duty dyl).

The vertical direction component of the driving force D for the second vertical coil 32*a*2 is defined as the second vertical driving force Dyr (after D/A conversion, the second vertical PWM duty dyr).

Driving of the movable platform 30*a*, including movement to the fixed (held) position of the third position, is performed by the electro-magnetic force of the coil unit and the magnetic unit through the driver circuit 29, which has the horizontal PWM duty dx input from the PWM 0 of the CPU 21, the first vertical PWM duty dyl input from the PWM 1 of the CPU 21, and the second vertical PWM duty dyr input from the PWM 2 of the CPU 21 (see (3) in FIG. 7).

The detected position P of the movable platform 30*a*, either before or after the movement/rotation performed by the driver circuit 29, is detected by the hall sensor unit 44*a* and the hall sensor signal-processing unit 45.

Information regarding the horizontal direction component of the detected position P, in other words, the horizontal detected position signal px, is input to the A/D converter A/D 3 of the CPU 21 (see (4) in FIG. 7). The horizontal detected position signal px is an analog signal that is converted to a digital signal by the A/D converter A/D 3 (A/D conversion operation). The horizontal direction component of the detected position P after the A/D conversion operation is defined as pdx and corresponds to the horizontal detected position signal px.

Information regarding one of the vertical direction components of the detected position P, in other words, the first vertical detected position signal pyl, is input to the A/D converter A/D 4 of the CPU 21. The first vertical detected position signal pyl is an analog signal that is converted to a digital signal by the A/D converter A/D 4 (A/D conversion operation). The first vertical direction component of the detected position P after the A/D conversion operation is defined as pdyl and corresponds to the first vertical detected position signal pyl.

Information regarding the other of the vertical direction components of the detected position P, in other words, the second vertical detected position signal pyr, is input to the A/D converter A/D 5 of the CPU 21. The second vertical detected position signal pyr is an analog signal that is converted to a digital signal by the A/D converter A/D 5 (A/D conversion operation). The second vertical direction component of the detected position P after the A/D conversion operation is defined as pdyr and corresponds to the second vertical detected position signal pyr.

The PID (Proportional Integral Differential) control calculates the horizontal driving force Dx and the first and second vertical driving forces Dyl and Dyr on the basis of the coordinate data of the detected position P (pdx, pdyl, pdyr) and the position S (Sx, Syl, Syr) following movement (see (5) in FIG. 7).

Driving of the movable platform 30*a* from the present position P (the first position) to the position S (the second position) corresponding to the inclination correction of the PID control is performed when the photographic apparatus 1 is in the inclination-correction mode (CP=1) where the inclination-correction ON/OFF correction switch 14*a* is set to the ON state.

When the inclination-correction parameter CP is 0, a PID control unrelated to the inclination correction is performed so that the movable platform 30*a* is moved to the third position (the center of the movement range) such that each of the four sides composing the outline of the imaging surface of the imager 39*a*1 of the imaging unit 39*a* is parallel to either the x direction or the y direction (see (6) in FIG. 7).

The movable platform 30*a* has the coil unit for driving that is comprised of a horizontal coil 31*a*, a first vertical coil 32*a*1, a second vertical coil 32*a*2, an imaging unit 39*a* having the imager 39*a*1, and a hall sensor unit 44*a* as a magnetic-field change-detecting element unit (see FIGS. 6 and 12). In the embodiment, the imager 39*a*1 is a CCD; however, the imager 39*a*1 may be another type, such as a CMOS, etc.

The fixed unit 30*b* has a magnetic position detection and driving unit that is comprised of a horizontal magnet 411*b*, a first vertical magnet 412*b*1, a second vertical magnet 412*b*2, a horizontal yoke 431*b*, a first vertical yoke 432*b*1, and a second vertical yoke 432*b*2.

The fixed unit 30*b* movably and rotatably supports the movable platform 30*a* in the rectangular-shaped movement range on the xy plane, using balls, etc. The balls are arranged between the fixed unit 30*b* and the movable platform 30*a*.

When the central area of the imager 39*a*1 is intersected by the optical axis LL of the camera lens 67, the relationship between the position of the movable platform 30*a* and the position of the fixed unit 30*b* is arranged so that the movable platform 30*a* is positioned at the center of its movement range in both the x direction and the y direction, in order to utilize the full size of the imaging range of the imager 39*a*1.

The rectangular shape of the imaging surface of the imager 39*a*1 has two diagonal lines. In the embodiment, the center of the imager 39*a*1 is at the intersection of these two diagonal lines.

The horizontal coil 31*a*, the first vertical coil 32*a*1, the second vertical coil 32*a*2, and the hall sensor unit 44*a* are attached to the movable platform 30*a*.

The horizontal coil 31*a* forms a seat and a spiral-shaped coil pattern. The coil pattern of the horizontal coil 31*a* has lines that are parallel to the y direction, thus creating the horizontal electro-magnetic force to move the horizontal driving point DPx on the movable platform 30*a* that includes the horizontal coil 31*a*, in the x direction.

The horizontal electro-magnetic force is created by the current direction of the horizontal coil 31a and the magnetic-field direction of the horizontal magnet 411b.

The first vertical coil 32a1 forms a seat and a spiral-shaped coil pattern. The coil pattern of the first vertical coil 32a1 has lines that are parallel to the x direction, thus creating the first vertical electro-magnetic force to move the first vertical driving point DPyl on the movable platform 30a that includes the first vertical coil 32a1, in the y direction.

The first vertical electro-magnetic force is created by the current direction of the first vertical coil 32a1 and the magnetic-field direction of the first vertical magnet 412b1.

The second vertical coil 32a2 forms a seat and a spiral-shaped coil pattern. The coil pattern of the second vertical coil 32a2 has lines that are parallel to the x direction, thus creating the second vertical electro-magnetic force to move the second vertical driving point DPyr on the movable platform 30a that includes the second vertical coil 32a2, in the y direction and to rotate the movable platform 30a.

The second vertical electro-magnetic force is created by the current direction of the second vertical coil 32a2 and the magnetic-field direction of the second vertical magnet 412b2.

The horizontal coil 31a and the first and second vertical coils 32a1 and 32a2 are connected to the driver circuit 29, which drives the horizontal coil 31a and the first and second vertical coils 32a1 and 32a2, through the flexible circuit board (not depicted).

The horizontal PWM duty dx, which is a duty ratio of a PWM pulse, is input to the driver circuit 29 from the PWM 0 of the CPU 21. The first vertical PWM duty dyl, which is a duty ratio of a PWM pulse, is input to the driver circuit 29 from the PWM 1 of the CPU 21. The second vertical PWM duty dyr, which is a duty ratio of a PWM pulse, is input to the driver circuit 29 from the PWM 2 of the CPU 21.

The driver circuit 29 supplies power to the horizontal coil 31a, corresponding to the value of the horizontal PWM duty dx, in order to move the horizontal driving point DPx on the movable platform 30a in the x direction.

The driver circuit 29 supplies power to the first vertical coil 32a1, corresponding to the value of the first vertical PWM duty dyl, in order to move the first vertical driving point DPyl on the movable platform 30a in the y direction.

The driver circuit 29 supplies power to the second vertical coil 32a2, corresponding to the value of the second vertical PWM duty dyr, in order to move the second vertical driving point DPyr on the movable platform 30a in the y direction.

The first and second vertical coils 32a1 and 32a2 are arranged in the x direction in the first state.

The first and second vertical coils 32a1 and 32a2 are arranged in the first state such that the distance between the center O of the imager 39a1 and the central area of the first vertical coil 32a1 in the y direction is the same as the distance between the center O of the imager 39a1 and the central area of the second vertical coil 32a2 in the y direction.

The horizontal magnet 411b is attached to the movable platform side of the fixed unit 30b, where the horizontal magnet 411b faces the horizontal coil 31a and the horizontal hall sensor hh10 in the z direction.

The first vertical magnet 412b1 is attached to the movable platform side of the fixed unit 30b, where the first vertical magnet 412b1 faces the first vertical coil 32a1 and the first vertical hall sensor hv1 in the z direction.

The second vertical magnet 412b2 is attached to the movable platform side of the fixed unit 30b, where the second vertical magnet 412b2 faces the second vertical coil 32a2 and the second vertical hall sensor hv2 in the z direction.

The horizontal magnet 411b is attached to the horizontal yoke 431b, such that the N pole and S pole are arranged in the x direction. The horizontal yoke 431b is attached to the fixed unit 30b.

The first vertical magnet 412b1 is attached to the first vertical yoke 432b1, such that the N pole and S pole are arranged in the y direction. The first vertical yoke 432b1 is attached to the fixed unit 30b.

Likewise, the second vertical magnet 412b2 is attached to the second vertical yoke 432b2, such that the N pole and S pole are arranged in the y direction. The second vertical yoke 432b2 is attached to the fixed unit 30b.

The horizontal yoke 431b is made of a soft magnetic material.

The horizontal yoke 431b prevents the magnetic field of the horizontal magnet 411b from dissipating to the surroundings, and raises the magnetic-flux density between the horizontal magnet 411b and the horizontal coil 31a, and between the horizontal magnet 411b and the horizontal hall sensor hh10.

The first and second vertical yokes 432b1 and 432b2 are made of a soft magnetic material.

The first vertical yoke 432b1 prevents the magnetic field of the first vertical magnet 412b1 from dissipating to the surroundings, and raises the magnetic-flux density between the first vertical magnet 412b1 and the first vertical coil 32a1, and between the first vertical magnet 412b1 and the first vertical hall sensor hv1.

Likewise, the second vertical yoke 432b2 prevents the magnetic field of the second vertical magnet 412b2 from dissipating to the surroundings, and raises the magnetic-flux density between the second vertical magnet 412b2 and the second vertical coil 32a2, and between the second vertical magnet 412b2 and the second vertical hall sensor hv2.

The horizontal yoke 431b and the first and second vertical yokes 432b1 and 432b2 may be composed of one body or separate bodies.

The hall sensor unit 44a is a single-axis hall sensor with three component hall sensors that are electromagnetic converting elements (magnetic-field change-detecting elements) using the Hall Effect. The hall sensor unit 44a detects the horizontal detected position signal px as the present position P of the movable platform 30a in the x direction, the first vertical detected position signal pyl and the second vertical detected position signal pyr as the present position P of the movable platform 30a in the y direction.

One of the three hall sensors is a horizontal hall sensor hh10 for detecting the horizontal detected position signal px, and another of the three hall sensors is a first vertical hall sensor hv1 for detecting the first vertical detected position signal pyl, with the third being a second vertical hall sensor hv2 for detecting the second vertical detected position signal pyr.

The horizontal hall sensor hh10 is attached to the movable platform 30a, where the horizontal hall sensor hh10 faces the horizontal magnet 411b of the fixed unit 30b in the z direction, and where the horizontal driving point DPx is set to a position close to the horizontal hall sensor hh10.

The horizontal hall sensor hh10 may be arranged outside the spiral winding of the horizontal coil 31a in the y direction. However, it is desirable for the horizontal hall sensor hh10 to be arranged inside the spiral winding of the horizontal coil 31a, and midway along the outer circumference of the spiral winding of the horizontal coil 31a in the x direction (see FIG. 12).

The horizontal hall sensor hh10 is layered on the horizontal coil 31a in the z direction. Accordingly, the area in which the magnetic field is generated for the position-detecting operation and the area in which the magnetic field is generated for driving the movable platform 30a are shared. Therefore, the length of the horizontal magnet 411b in the y direction and the length of the horizontal yoke 431b in the y direction can be shortened.

Furthermore, the horizontal driving point DPx, to which the horizontal electro-magnetic force based on the horizontal coil 31a is applied, can be close to a position-detecting point by the horizontal hall sensor hh10. Therefore, accurate driving control of the movable platform 30a in the x direction can be performed.

The first vertical hall sensor hv1 is attached to the movable platform 30a, where the first vertical hall sensor hv1 faces the first vertical magnet 412b1 of the fixed unit 30b in the z direction, and where the first vertical driving point DPyl is set to a position close to the first vertical hall sensor hv1.

The second vertical hall sensor hv2 is attached to the movable platform 30a, where the second vertical hall sensor hv2 faces the second vertical magnet 412b2 of the fixed unit 30b in the z direction, and where the second vertical driving point DPyr is set to a position close to the second vertical hall sensor hv2.

The distance between the first vertical hall sensor hv1 and the second vertical hall sensor hv2 is equal to the value of the hall sensor distance coefficient HSD.

The first and second vertical hall sensors hv1 and hv2 are arranged in the x direction in the first state.

The first vertical hall sensor hv1 may be arranged outside the spiral winding of the first vertical coil 32a1 in the x direction. However, it is desirable for the first vertical hail sensor hv1 to be arranged inside the spiral winding of the first vertical coil 32a1, and midway along the outer circumference of the spiral winding of the first vertical coil 32a1 in the y direction.

The first vertical hall sensor hv1 is layered on the first vertical coil 32a1 in the z direction. Accordingly, the area in which the magnetic field is generated for the position-detecting operation and the area in which the magnetic field is generated for driving the movable platform 30a are shared. Therefore, the length of the first vertical magnet 412b1 in the x direction and the length of the first vertical yoke 432b1 in the x direction can be shortened.

The second vertical hall sensor hv2 may be arranged outside the spiral winding of the second vertical coil 32a2 in the x direction. However, it is desirable for the second vertical hall sensor hv2 to be arranged inside the spiral winding of the second vertical coil 32a2, and midway along the outer circumference of the spiral winding of the second vertical coil 32a2 in the y direction.

The second vertical hall sensor hv2 is layered on the second vertical coil 32a2 in the z direction. Accordingly, the area in which the magnetic field is generated for the position-detecting operation and the area in which the magnetic field is generated for driving the movable platform 30a are shared. Therefore, the length of the second vertical magnet 412b2 in the x direction and the length of the second vertical yoke 432b2 in the x direction can be shortened.

Furthermore, the first vertical driving point DPyl, to which the first vertical electro-magnetic force based on the first vertical coil 32a1 is applied, can be close to a position-detecting point by the first vertical hall sensor hv1, and the second vertical driving point DPyr, to which the second vertical electro-magnetic force based on the second vertical coil 32a2 is applied, can be close to a position-detecting point by the second vertical hall sensor hv2. Therefore, accurate driving control of the movable platform 30a in the y direction can be performed.

In the first state and when the center O of the imager 39a1 is intersected by the optical axis LL of the camera lens 67, it is desirable for the horizontal hall sensor hh10 to be located on the hall sensor unit 44a so that it faces an intermediate area between the N pole and S pole of the horizontal magnet 411b in the x direction, as viewed from the z direction, to perform the position-detecting operation and utilize the full range within which an accurate position-detecting operation can be performed based on the linear output change (linearity) of the single-axis hall sensor.

Similarly, in the first state and when the center O of the imager 39a1 is intersected by the optical axis LL of the camera lens 67, it is desirable for the first vertical hall sensor hv1 to be located on the hall sensor unit 44a so that it faces an intermediate area between the N pole and S pole of the first vertical magnet 412b1 in the y direction, as viewed from the z direction.

Likewise, in the first state and when the center O of the imager 39a1 is intersected by the optical axis LL of the camera lens 67, it is desirable for the second vertical hall sensor hv2 to be located on the hall sensor unit 44a so that it faces an intermediate area between the N pole and S pole of the second vertical magnet 412b2 in the y direction, as viewed from the z direction.

The first hall sensor signal-processing unit 45 has a signal processing circuit of the magnetic-field change-detecting element that is comprised of a first hall sensor signal-processing circuit 450, a second hall sensor signal-processing circuit 460, and a third hall sensor signal-processing circuit 470.

The first hall sensor signal-processing circuit 450 detects a horizontal potential difference between the output terminals of the horizontal hall sensor hh10, based on the output signal of the horizontal hall sensor hh10.

The first hall sensor signal-processing circuit 450 outputs the horizontal detected position signal px to the A/D converter A/D 3 of the CPU 21, on the basis of the horizontal potential difference. The horizontal detected position signal px represents the specific location of the horizontal hall sensor hh10 on the movable platform 30a, in the x direction.

The first hall sensor signal-processing circuit 450 is connected to the horizontal hall sensor hh10 through the flexible circuit board (not depicted).

The second hall sensor signal-processing circuit 460 detects a first vertical potential difference between the output terminals of the first vertical hall sensor hv1, based on the output signal of the first vertical hall sensor hv1.

The second hall sensor signal-processing circuit 460 outputs the first vertical detected position signal pyl to the A/D converter A/D 4 of the CPU 21, on the basis of the first vertical potential difference. The first vertical detected position signal pyl represents the specific location of the first vertical hall sensor hv1 (the position-detecting point by the first vertical hall sensor hv1) on the movable platform 30a, in the y direction.

The second hall sensor signal-processing circuit 460 is connected to the first vertical hall sensor hv1 through the flexible circuit board (not depicted).

The third hall sensor signal-processing circuit 470 detects a second vertical potential difference between the output terminals of the second vertical hall sensor hv2, based on the output signal of the second vertical hall sensor hv2.

The third hall sensor signal-processing circuit 470 outputs the second vertical detected position signal pyr to the A/D converter A/D 5 of the CPU 21, on the basis of the second vertical potential difference. The second vertical detected position signal pyr represents the specific location of the second vertical hall sensor hv2 (the position-detecting point by the second vertical hall sensor hv2) on the movable platform 30a, in the y direction.

The third hall sensor signal-processing circuit 470 is connected to the second vertical hall sensor hv2 through the flexible circuit board (not depicted).

In the embodiment, the three hall sensors (hh10, hv1 and hv2) are configured to specify the location of the movable platform 30a including the rotational (inclination) angle.

The locations in the y direction of the two points on the movable platform 30a are determined by using two of the three hall sensors (hv1 and hv2). These two points are close to the first vertical driving point DPyl and the second vertical driving point DPyr, respectively. The location in the x direction of the one point on the movable platform 30a is determined by using another of the three hall sensors (hh10). This one point is close to the horizontal driving point DPx. The location of the movable platform 30a, which includes the rotational (inclination) angle on the xy plane, can be determined on the basis of the information regarding the locations in the x direction of the one point and the location in the y direction of the two points.

Next, the main operation of the photographic apparatus 1 in the embodiment is explained using the flowchart of FIGS. 14 and 15.

When the PON switch 11a is set to the ON state, the photographic apparatus 1 is set to the ON state and electrical power is supplied to the inclination detection unit 25 so that the inclination detection unit 25 is set to the ON state in step S11.

In step S12 the CPU 21 initializes the values. The values include the rotation quantity α, the release-state parameter RP, and the mirror-state parameter MP.

Specifically, the CPU 21 sets the values of the rotation quantity α, the release-state parameter RP, and the mirror-state parameter MP to 0. Furthermore, the lens information is communicated from the camera lens 67 to the CPU 21.

In step S13, a timer interrupt process at the predetermined time interval (1 ms) commences. The details of the timer interrupt process in the embodiment are explained later using the flowcharts of FIGS. 16-18.

In step S14, the CPU 21 determines whether the photometric switch 12a (P-SW in FIG. 14) is set to the ON state. When the CPU 21 determines that the photometric switch 12a is not set to the ON state, the process described in step S14 is repeated. Otherwise, the operation continues on to step S15.

In step S15, the CPU 21 determines whether the inclination-correction ON/OFF switch 14a (C-SW in FIG. 14) is set to the ON state. When the CPU 21 determines that the inclination-correction ON/OFF switch 14a is not set to the ON state, the operation continues to step S16. Otherwise, the operation proceeds to step S17.

In step S16, the CPU 21 sets the value of the inclination-correction parameter CP to 0.

In step S17, the CPU 21 sets the value of the inclination-correction parameter CP to 1.

In step S18, the photometric operation is performed by the AE unit 23 so that the aperture value and the duration of the exposure operation are calculated.

In step S19, the AF sensing operation is performed by the AF unit 24 and the focusing operation is performed by driving the lens control circuit.

In step S20, the CPU 21 determines whether the shutter release switch 13a (R-SW in FIG. 15) is set to the ON state. When the CPU 21 determines that the shutter release switch 13a is not set to the ON state, the operation returns to step S14 and the process described in steps S14-S19 is repeated. Otherwise, the operation continues on to step S21.

In step S21, the CPU 21 sets the value of the release-state parameter RP to 1, and then the release-sequence operation commences.

Then, the CPU 21 sets the value of the mirror-state parameter MP to 1.

In step S22, the mirror-up operation and the aperture closing operation, which correspond to the aperture value that is either preset or calculated, are performed by the mirror-aperture-shutter unit 20.

After the mirror-up operation is finished, the CPU 21 sets the value of the mirror-state parameter MP to 0, in step S23. In step S24, the opening operation of the shutter (the movement of the front curtain of the shutter) commences.

In step S25, the exposure operation, that is, the electric charge accumulation of the imager 39a1 (CCD etc.), is performed. After the exposure time has elapsed, the closing operation of the shutter (the movement of the rear curtain in the shutter), the mirror-down operation, and the opening operation of the aperture are performed by the mirror-aperture-shutter unit 20, in step S26.

In step S27, the CPU 21 sets the value of the release-state parameter RP to 0 so that the photometric switch 12a and the shutter release switch 13a are set to the OFF state and the release-sequence operation is finished. In step S28, the electric charge accumulated in the imager 39a1 during the exposure time is read. In step S29, the CPU 21 communicates with the DSP 19 so that the image-processing operation is performed based on the electric charge read from the imager 39a1. The image on which the image-processing operation is performed is stored in the memory of the photographic apparatus 1. In step S30, the image stored in the memory is displayed on the display 17, and the operation then returns to step S14. In other words, the photographic apparatus 1 is returned to a state in which the next imaging operation can be performed.

Figure 16:
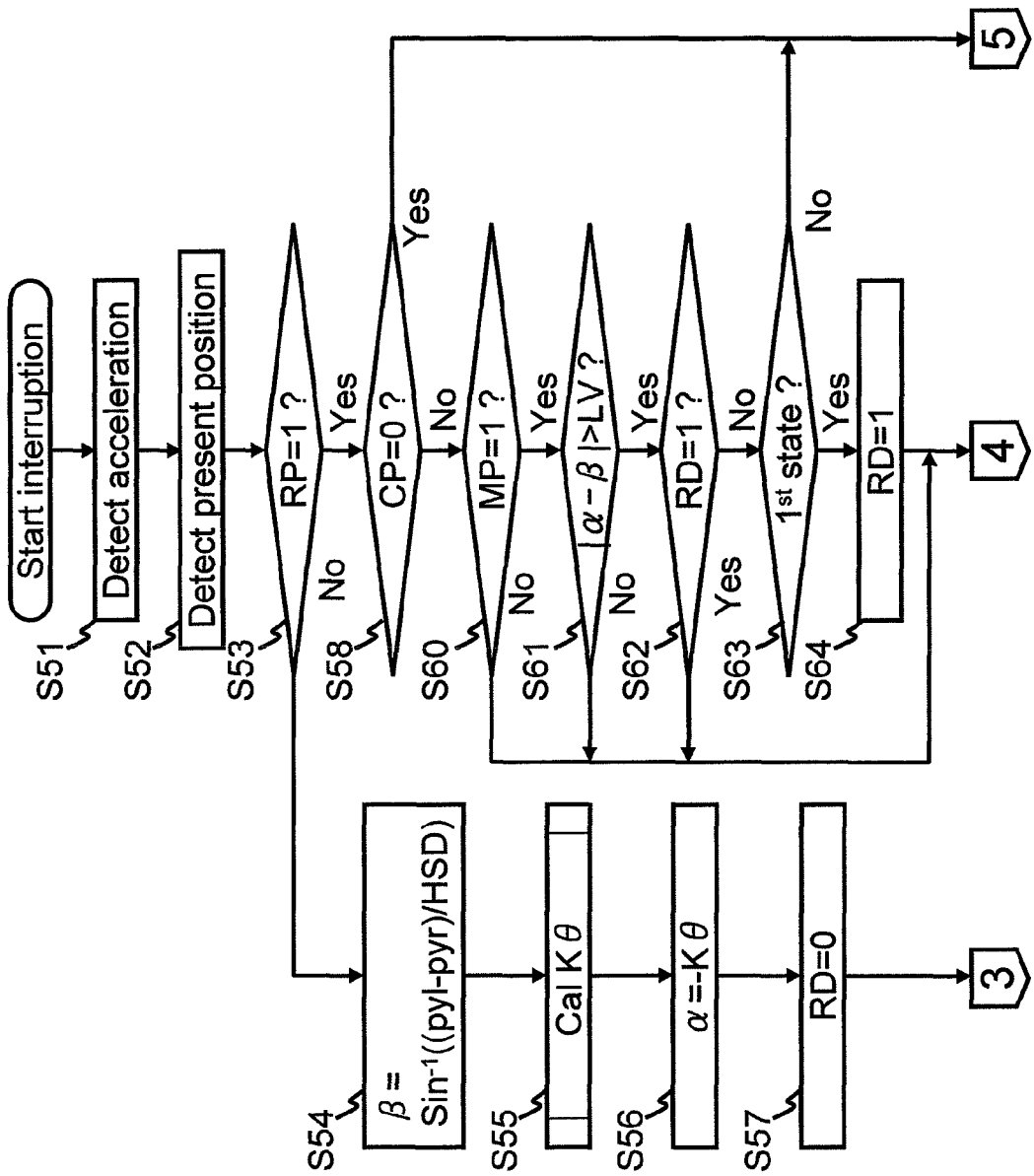
FIGS. 16 and 17 are a flowchart that shows the details of the timer interrupt process.

Next, the timer interrupt process in the embodiment, which commences in step S13 of FIG. 14 and is performed at every predetermined time interval (1 ms) independent of the other operations, is explained using the flowchart of FIGS. 16 and 17.

When the timer interrupt process commences, the first acceleration ah, which is output from the inclination detection unit 25, is input to the A/D converter A/D 1 of the CPU 21 and converted to the first digital acceleration signal Dah in step S51. Similarly, the second acceleration av, which is also output from the inclination detection unit 25, is input to the A/D converter A/D 2 of the CPU 21 and converted to the second digital acceleration signal Dav (the acceleration detection operation).

In the acceleration detection operation in step S51, the first acceleration ah and the second acceleration av, which are amplified by the first and second amplifiers 28a and 28b, are input to the CPU 21.

The high frequencies of the first and second digital acceleration signals Dah and Dav are reduced in the digital low-pass filtering process (the first and second digital acceleration Aah and Aav).

In step S52, the hall sensor unit 44a detects the position of the movable platform 30a. The horizontal detected position signal px and the first and second vertical detected position signals pyl and pyr are calculated by the hall sensor signal-processing unit 45. The horizontal detected position signal px is then input to the A/D converter A/D 3 of the CPU 21 and converted to the digital signal pdx, the first vertical detected position signal pyl is then input to the A/D converter A/D 4 of the CPU 21 and converted to the digital signal pdyl, and the second vertical detected position signal pyr is input to the A/D converter A/D 5 of the CPU 21 and also converted to the digital signal pdyr, both of which thus specify the present position P (pdx, pdyl, pdyr) of the movable platform 30a (see (4) in FIG. 7).

In step S53, the CPU 21 determines whether the value of the release-state parameter RP is set to 1. When the CPU 21 determines that the value of the release-state parameter RP is not set to 1, the operation continues to step S54. Otherwise, the operation proceeds to step S58.

In step S54, the CPU 21 calculates the movable platform inclination angle $\beta$ on the basis of the hall sensor distance coefficient HSD, the first vertical detected position signal pyl, and the second vertical detected position signal pyr ($\beta=\mathrm{Sin}^{-1}$ ((pyl−pyr)÷HSD)).

In step S55, the CPU 21 calculates the camera inclination angle K$\theta$ on the basis of the first and second digital accelerations Aah and Aav (see (1) in FIG. 7).

The details of the calculation of the camera inclination angle K$\theta$ in the embodiment are explained later using the flowchart of FIG. 18.

In step S56, the CPU 21 calculates the magnitude of the rotation quantity $\alpha$ on the basis of the camera inclination angle K$\theta$ ($\alpha=-K\theta$).

In step S57, the CPU 21 sets the value of the rotation parameter RD to 0.

While the value of the release-state parameter RP is set to 1, the operations in steps S58-S67 are performed so that the calculation for the camera inclination angle K$\theta$ is not performed. Therefore, during the release sequence operation, the controlled movement is performed by using the rotation quantity $\alpha$, which is determined on the basis of the camera inclination angle K$\theta$, calculated immediately before the shutter release switch 13a is set to the ON state.

In step S58, the CPU 21 determines whether the value of the inclination-correction parameter CP is 0. When the CPU 21 determines that the value of the inclination-correction parameter CP is 0 (CP=0), in other words, that the photographic apparatus 1 is not in the inclination-correction mode, the operation continues to step S59.

When the CPU 21 determines that the value of the inclination-correction parameter CP is not 0 (CP=1), in other words when the photographic apparatus 1 is in inclination-correction mode, the operation proceeds to step S60.

In step S59, the CPU 21 sets the position S (Sx, Syl, Syr), which is where the movable platform 30a should be moved, to the center of its movement range in both the x and y directions, under the condition in which each of the four sides of the rectangle composing the outline of the imaging surface of the imager (an imaging sensor) 39a1 is parallel to either the x direction or the y direction. (see (6) in FIG. 7). In other words, the position S is set to the third position (where the movable platform 30a is in the first state).

In step S60, the CPU 21 determines whether the value of the mirror-state parameter MP is 1. When the CPU 21 determines that the value of the mirror-state parameter MP is 1 (MP=1), the operation continues to step S61. Otherwise, the operation proceeds to step S65.

Therefore, the controlled movement of the movable platform 30a from the first position to the third position is performed until the completion of the mirror-up operation.

After the completion of the mirror-up operation, the controlled movement of the movable platform 30a to the second position is performed regardless of whether the movable platform 30a reaches the third position or not.

In step S61, the CPU 21 determines whether the absolute value of the difference between the rotation quantity $\alpha$ and the movable platform inclination angle $\beta$ is larger than the threshold angle LV.

When the CPU 21 determines that the absolute value of the difference between the rotation quantity $\alpha$ and the movable platform inclination angle $\beta$ is larger than the threshold angle LV ($|\alpha-\beta|>$LV), the operation continues to step S62. Otherwise, the operation proceeds to step S65.

In step S62, the CPU 21 determines whether the value of the rotation parameter RD is set to 1. When the CPU 21 determines that the value of the rotation parameter RD is not set to 1, the operation continues to step S63. Otherwise, the operation proceeds to step S65.

In step S63, the CPU 21 determines whether the movable platform 30a is in the third position, in other words, the movable platform 30a is in the first state. When the CPU 21 determines that the movable platform 30a is not in the third position, the operation returns to step S59. Otherwise, the operation continues to step S64.

In step S64, the CPU 21 sets the value of the rotation parameter RD to 1.

In step S65, the CPU 21 calculates the position S (Sx, Syl, Syr) where the movable platform 30a should be moved (the movement position Sx of the horizontal driving point DPx, the movement position Syl of the first vertical driving point DPyl, and the movement position Syr of the second vertical driving point DPyr), on the basis of the rotation quantity $\alpha$, etc. (see (2) in FIG. 7).

In step S66, the CPU 21 calculates the horizontal driving force Dx (the horizontal PWM duty dx), the first vertical driving force Dyl (the first vertical PWM duty dyl), and the second vertical driving force Dyr (the second vertical PWM duty dyr) of the driving force D, which moves the movable platform 30a to the position S on the basis of the present position P (pdx, pdyl, pdyr) and the coordinates of position S (Sx, Syl, Syr) that were determined in step S59 or step S65 (see (5) in FIG. 7).

In step S67, the horizontal coil 31a is driven by applying the horizontal PWM duty dx through the driver circuit 29: the first vertical coil 32a1 is driven by applying the first vertical PWM duty dyl through the driver circuit 29 and the second vertical coil 32a2 is driven by applying the second vertical PWM duty dyr through the driver circuit 29, so that the movable platform 30a is moved to position S (Sx, Syl, Syr) (see (3) in FIG. 7).

The process of steps S66 and S67 is an automatic control calculation that is performed by the PID automatic control for performing general (normal) proportional, integral, and differential calculations.

Next, the calculation of the camera inclination angle K$\theta$, which is performed in step S55 of FIG. 16, is explained using the flowchart of FIG. 18.

When the calculation of the camera inclination angle K$\theta$ commences, the CPU 21 determines whether the absolute value of the second digital acceleration Aav is larger than or equal to the absolute value of the first digital acceleration Aah, in step S71.

When the CPU 21 determines that the absolute value of the second digital acceleration Aav is larger than or equal to the absolute value of the first digital acceleration Aah, the operation proceeds to step S75, otherwise, the operation continues to step S72.

In step S72, the CPU 21 determines whether the first digital acceleration Aah is larger than or equal to 0. When the CPU 21 determines that the first digital acceleration Aah is larger than or equal to 0, the operation proceeds to step S74, otherwise, the operation continues to step S73.

In step S73, the CPU 21 determines that the photographic apparatus 1 is held approximately in the first vertical orientation, and calculates the camera inclination angle Kθ by taking the negative value of the arcsine transformation of the second digital acceleration Aav (Kθ=−Sin$^{-1}$ (Aav)).

In step S74, the CPU 21 determines that the photographic apparatus is held approximately in the second vertical orientation, and calculates the camera inclination angle Kθ by performing the arcsine transformation on the second digital acceleration Aav (Kθ=+Sin$^{-1}$ (Aav)).

In step S75, the CPU 21 determines whether the second digital acceleration Aav is larger than or equal to 0. When the CPU 21 determines that the second digital acceleration Aav is larger than or equal to 0, the operation proceeds to step S77, otherwise, the operation continues to step S76.

In step S76, the CPU 21 determines that the photographic apparatus 1 is held approximately in the second horizontal orientation, and calculates the camera inclination angle Kθ by performing the arcsine transformation on the first digital acceleration Aah (Kθ=+Sin$^{-1}$ (Aah)).

In step S77, the CPU 21 determines that the photographic apparatus is held approximately in the first horizontal orientation, and calculates the camera inclination angle Kθ by taking the negative value of the arcsine transformation of the first digital acceleration Aah (Kθ=−Sin$^{-1}$ (Aah)).

Because the horizontal hall sensor hh10, the first vertical hall sensor hv1, and the second vertical hall sensor hv2 are fixed on the movable platform 30a, the distances between them do not change while the movable platform 30a is moving.

In the case that the movement quantity of the movable platform 30a is small, the movement quantity of the horizontal hall sensor hh10, the movement quantity of the first hall sensor hv1, and the movement quantity of the second hall sensor hv2 are almost the same. Therefore, the movable platform 30a can be moved through translational motion without rotation under the condition in which the distances between the horizontal hall sensor hh10, the first vertical hall sensor hv1, and the second vertical hall sensor hv2 do not change.

On the other hand, in the case that the movable platform 30a rotates and the movement quantity of the movable platform 30a is large, the movement quantity of the horizontal hall sensor hh10, the movement quantity of the first hall sensor hv1, and the movement quantity of the second hall sensor hv2 are not same. Therefore, the movable platform 30a cannot be moved through only translational motion under the condition in which the distances between the horizontal hall sensor hh10, the first vertical hall sensor hv1, and the second vertical hall sensor hv2 do not change. The track of the movable platform 30a may be turbulent so that the required time to move from the present position P (the first position) to the position S (the second position) may be long (see FIG. 19).

Figure 20:
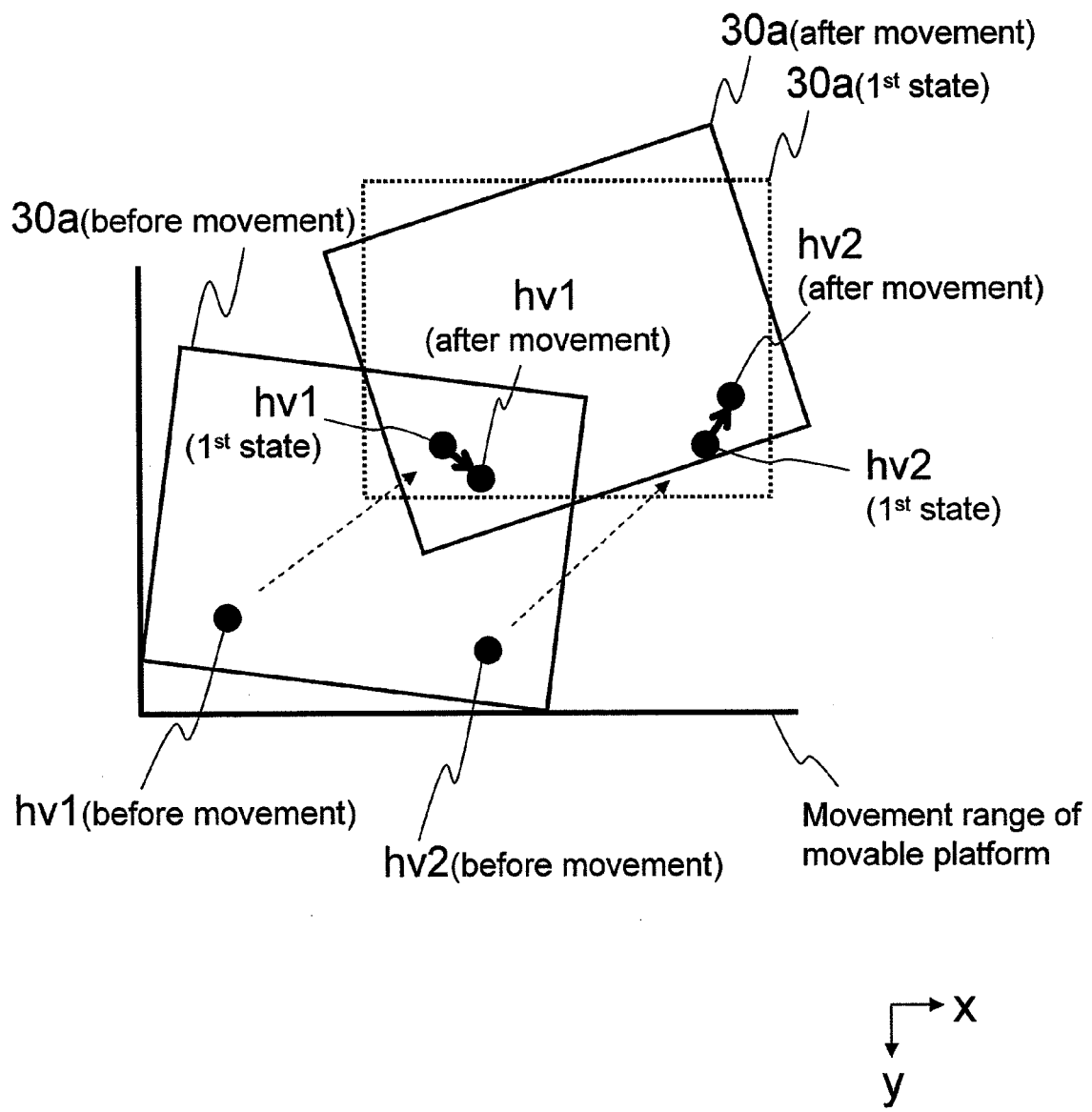
FIG. 20 shows a positional relationship between the movable platform, the first vertical hall sensor, and the second vertical hall sensor, when the movable platform is moved from the first position to the second position via the third position.

In the embodiment, when the rotation angle, which is shown as the absolute value of the difference between the rotation quantity α and the movable platform inclination angle β ($|\alpha-\beta|$), for moving the movable platform 30a from the present point P (the first position) to the position S (the second position) is larger than the threshold angle LV, it is determined that the movement quantity is large so that the movable platform 30a is moved from the present position P (the first position) to the intermediate third position, then, the movable platform 30a is moved from the third position to the position S (the second position) (see FIG. 20).

Figure 19:
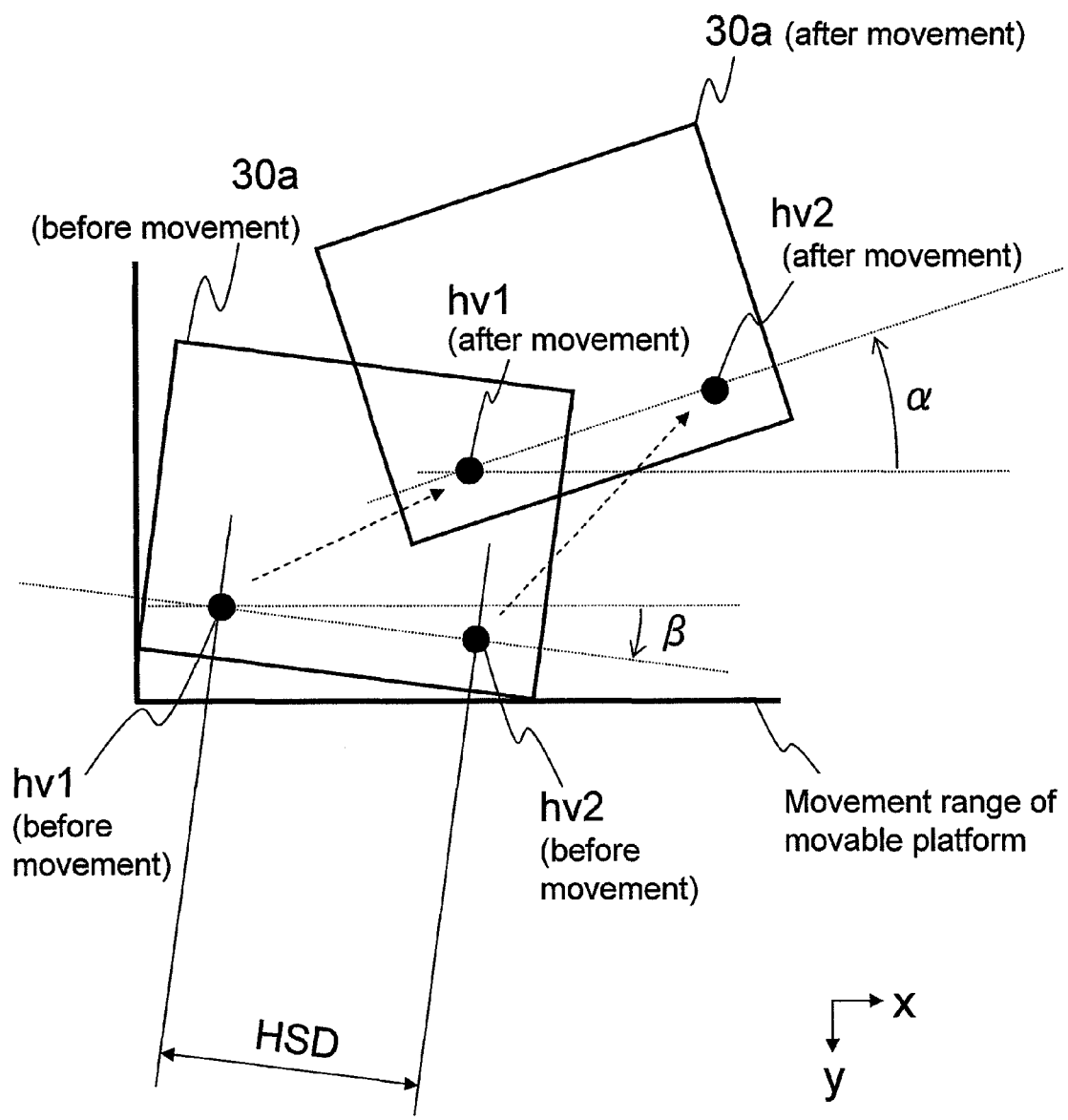
FIG. 19 shows a positional relationship between the movable platform, the first vertical hall sensor, and the second vertical hall sensor, when the movable platform is moved directly from the first position to the second position.

When the movable platform 30a is moved from the first position to the intermediate third position (see broken lines in FIG. 20), the differences between the movement quantities of the hall sensors hh10, hv1, and hv2 are not so large compared to when the movable platform 30a is moved directly from the first position to the second position (see FIG. 19). Furthermore, the movable platform 30a can be moved through translational motion without rotation under the condition in which the distances between the hall sensors hh10, hv1, and hv2 are held constant. Therefore, turbulence in the track of the movable platform 30a can be mitigated.

The movement of the movable platform 30a from the third position to the second position (see heavy lines in FIG. 20) is a rotational motion without translation around the center O of the imager 39a1, in other words, the rotation under the condition in which the rotational axis is not moved. Therefore, the movable platform 30a can be rotated under the condition in which the distances between the hall sensor hh10, hv1, and hv2 are held constant. Accordingly, turbulence in the track of the movable platform 30a can be mitigated.

Note that when the controlled movement of the movable platform 30a from the first position to the second position is performed, two steps of the controlled movement are performed. One is the controlled movement from the first position to the third position. The other is the controlled (rotational) movement from the third position to the second position. Therefore, the movement direction of the movable platform 30a changes at the third position so that the shock caused by the movement of the movable platform 30a may be transmitted to the user holding the photographic apparatus 1, and may bring discomfort to the user.

However, because the controlled movement to the third position is performed during the mirror-up operation, the vibration caused by the mirror-up operation negates the shock caused by the movement of the movable platform 30a via the third position. Therefore, the possibility of this shock bringing discomfort to the user is small.

Furthermore, it is explained that the hall sensor is configured to perform position detection as the magnetic-field change-detecting element. However, another detection element, an MI (Magnetic Impedance) sensor such as a high-frequency carrier-type magnetic-field sensor, a magnetic resonance-type magnetic-field detecting element, or an MR (Magneto-Resistance effect) element may be configured to perform position detection purposes. When one of either the MI sensor, the magnetic resonance-type magnetic-field detecting element, or the MR element is used, the information regarding the position of the movable platform can be obtained by detecting the magnetic-field change, similar to using the hall sensor.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2008-330681 (filed on Dec. 25, 2008), which is expressly incorporated herein by reference, in its entirety.

The invention claimed is:

1. A photographic apparatus comprising:
   a movable platform that has an imager that captures an optical image through a taking lens, and is movable and rotatable on an xy plane perpendicular to an optical axis of said taking lens; and
   a controller that calculates an inclination angle of said photographic apparatus, which is formed by rotation of said photographic apparatus around said optical axis, as measured with respect to a level plane perpendicular to the direction of gravitational force, and performs a controlled movement of said movable platform for an inclination correction based on said inclination angle;

said controller calculating a first position of said movable platform before said inclination correction;

said controller calculating a second position of said movable platform after said inclination correction;

said controller determining whether said movable platform should be moved to a third position before moving from said first position to said second position in said inclination correction, on the basis of a positional relationship between said first position and said second position;

said third position being a position of said movable platform in an imaging operation by said imager without said inclination correction;

said second position being a position of said movable platform in an imaging operation by said imager with said inclination correction, and being a position whereto said movable platform is rotated without translation from said third position in accordance to said inclination angle.

2. The photographic apparatus according to claim 1, wherein said controller moves said movable platform to said third position before moving from said first position to said second position, when a rotation angle of said movable platform for moving said movable platform from said first position to said second position is larger than a threshold angle.

3. The photographic apparatus according to claim 1, said controller performs said inclination correction on the basis of said inclination angle calculated before a shutter release switch is set to the ON state, performs a first controlled movement of said movable platform to said third position during a mirror-up operation after said shutter release switch is set to the ON state, and performs a second controlled movement of said movable platform to said second position after completion of said mirror-up operation or after completion of said first controlled movement.

* * * * *